United States Patent
Shin et al.

(10) Patent No.: US 11,160,094 B2
(45) Date of Patent: Oct. 26, 2021

(54) METHOD FOR TRANSMITTING/RECEIVING DATA IN WIRELESS COMMUNICATION SYSTEM SUPPORTING NARROW-BAND INTERNET OF THINGS, AND APPARATUS FOR SAME

(71) Applicant: LG ELECTRONICS INC., Seoul (KR)

(72) Inventors: Seokmin Shin, Seoul (KR); Hyangsun You, Seoul (KR); Joonkui Ahn, Seoul (KR); Yunjung Yi, Seoul (KR); Seunggye Hwang, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/324,067

(22) PCT Filed: Aug. 9, 2017

(86) PCT No.: PCT/KR2017/008647
§ 371 (c)(1),
(2) Date: Feb. 7, 2019

(87) PCT Pub. No.: WO2018/030793
PCT Pub. Date: Feb. 15, 2018

(65) Prior Publication Data
US 2019/0174510 A1  Jun. 6, 2019

Related U.S. Application Data

(60) Provisional application No. 62/372,323, filed on Aug. 9, 2016, provisional application No. 62/372,324, filed
(Continued)

(51) Int. Cl.
*H04W 72/12* (2009.01)
*H04W 72/00* (2009.01)
*H04W 72/04* (2009.01)

(52) U.S. Cl.
CPC .......... *H04W 72/12* (2013.01); *H04W 72/00* (2013.01); *H04W 72/042* (2013.01)

(58) Field of Classification Search
CPC .... H04W 72/12; H04W 72/00; H04W 72/042
See application file for complete search history.

(56) References Cited

U.S. PATENT DOCUMENTS

2009/0088148 A1  4/2009  Chung et al.
2011/0228724 A1  9/2011  Gaal et al.
(Continued)

FOREIGN PATENT DOCUMENTS

| CN | 101873528 | 10/2010 |
| CN | 102170610 | 8/2011 |
| WO | 2016/123547 A1 | 8/2016 |

OTHER PUBLICATIONS

Nokia: "MTC UE Behavior for Simultaneous Reception of Multiple Transport Blocks", R1-156635, 3GPP TSG RAN WG1 Meeting #83, Anaheim, USA, Nov. 15-22, 2015.
(Continued)

*Primary Examiner* — Kent Krueger
(74) *Attorney, Agent, or Firm* — Dentons US LLP

(57) ABSTRACT

The present invention discloses a method for transmitting/receiving data in a wireless communication system supporting NB-IoT and a device for the method. More specifically, the method comprises receiving a first NPDCCH through a first search space; receiving a first NPDSCH carrying an SC-MCCH; receiving a second NPDCCH through a second search space; receiving a second NPDSCH carrying an SC-MTCH; and when a time period configured for at least one of a third NPDCCH or a third NPDSCH overlaps at least one of the first search space, a time period configured for the first NPDSCH, the second search space, or a time period configured for the second NPDSCH, preferentially receiving at least one of the third NPDSSCH or the third NPDSCH,
(Continued)

wherein the third NPDCCH and the third NPDSCH are channels configured for either paging or random access.

20 Claims, 15 Drawing Sheets

Related U.S. Application Data on Aug. 9, 2016, provisional application No. 62/373,374, filed on Aug. 11, 2016, provisional application No. 62/385,252, filed on Sep. 9, 2016, provisional application No. 62/396,835, filed on Sep. 20, 2016, provisional application No. 62/400,647, filed on Sep. 28, 2016, provisional application No. 62/400,645, filed on Sep. 28, 2016, provisional application No. 62/405,266, filed on Oct. 7, 2016.

(56) References Cited

U.S. PATENT DOCUMENTS

| | | |
|---|---|---|
| 2012/0093051 A1 | 4/2012 | Xu |
| 2015/0181578 A1 | 6/2015 | Kwon et al. |
| 2018/0242278 A1* | 8/2018 | Xu .................. H04W 16/02 |
| 2019/0069277 A1* | 2/2019 | Awad ................ H04L 5/0053 |

OTHER PUBLICATIONS

KT Corp: "Views on non-simultaneous reception for MTC UEs", R1-157375, 3GPP TSG RAN WG1 Meeting #83, Anaheim, USA, Nov. 15-22, 2015.

Huawei: "SC-PTM configuration and operation", R2-153378, 3GPP TSG RAN WG1 Meeting #91, Beijing, China, Aug. 24-28, 2015.

Intel Corporation, "some remaining issues on NPDCCH related to TS 36.213", R1-165229, 3GPP TSG RAN WG1 Meeting #85, Nanjing, China, May 23-27, 2016, See pp. 1, 2.

Qualcomm Incorporated, "On NPDCCH Search Space", R1-164404, 3GPP TSG RAN1 #85, Nanjing, China, May 23-27, 2016, See section 2.3; and figure 2.

Zte, "Comments on UE procedures for NB-IoT and TP for 36.213", R1-165129, 3GPP TSG RAN WG1 Meeting #85, Nanjing, China, May 23-27, 2016, See section 2.

Huawei, HiSilicon, "Search space and collision handling for multicast in NB-IoT", 3GPP TSG RAN WG1 Meeting #86, Aug. 22-26, 2016, R1-166199.

Nokia, Alcatel-Lucent Shanghai Bell, "On Multicast Support for NB-IoT", 3GPP TSG-RAN WG1 Meeting #86, Aug. 2-26, 2016, R1-166591.

Zte, "Consideration for multicast support for NB-IoT", 3GPP TSG RAN WG1 Meeting #86, Aug. 22-26, 2016, R1-167325.

* cited by examiner

FIG. 4
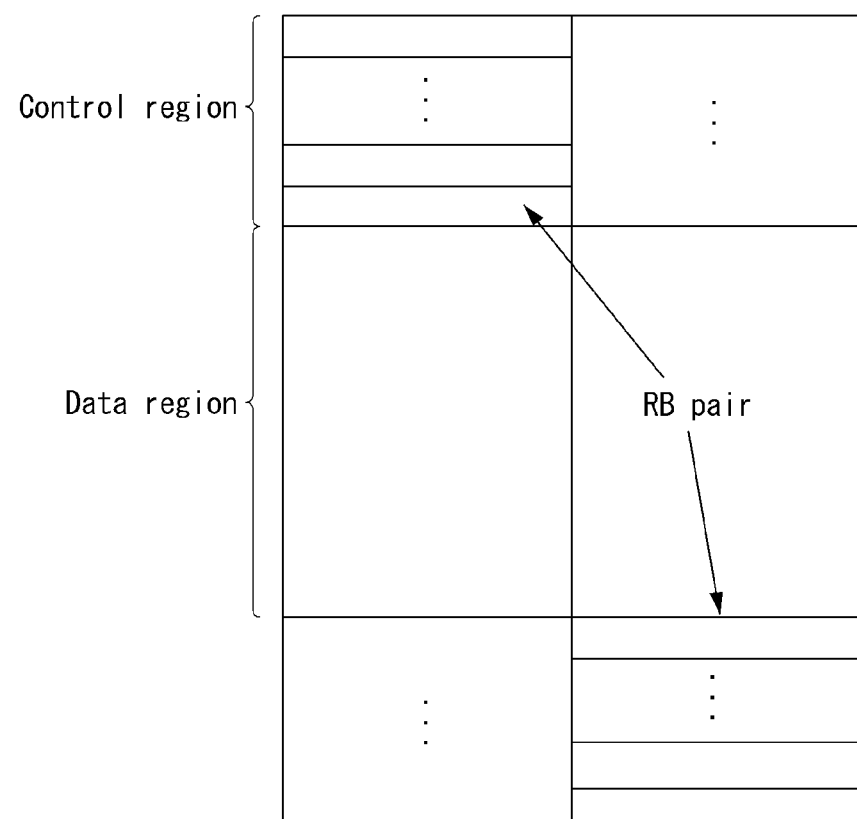
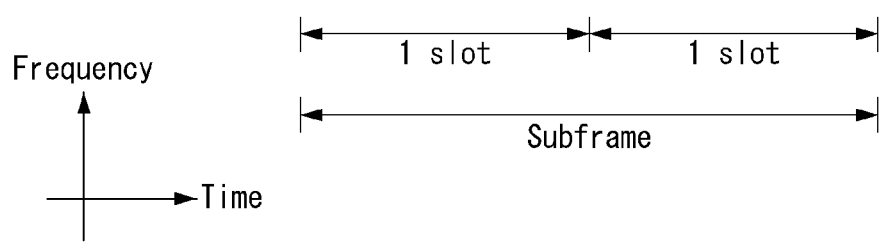

FIG. 7
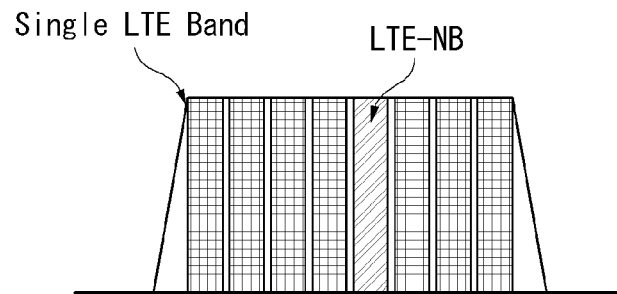
(a) In-band system
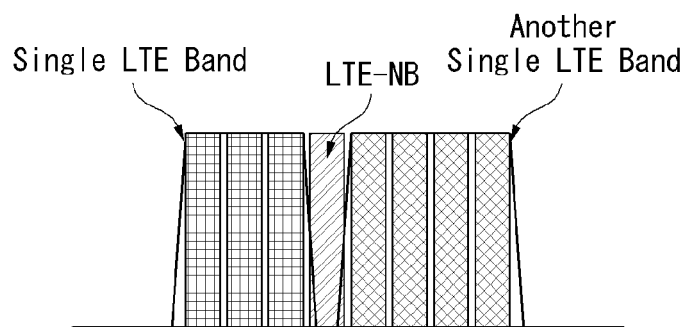
(b) Guard-band system
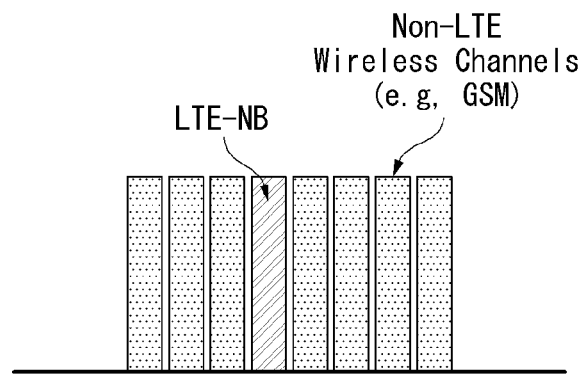
(c) Stand-alone system FIG. 13
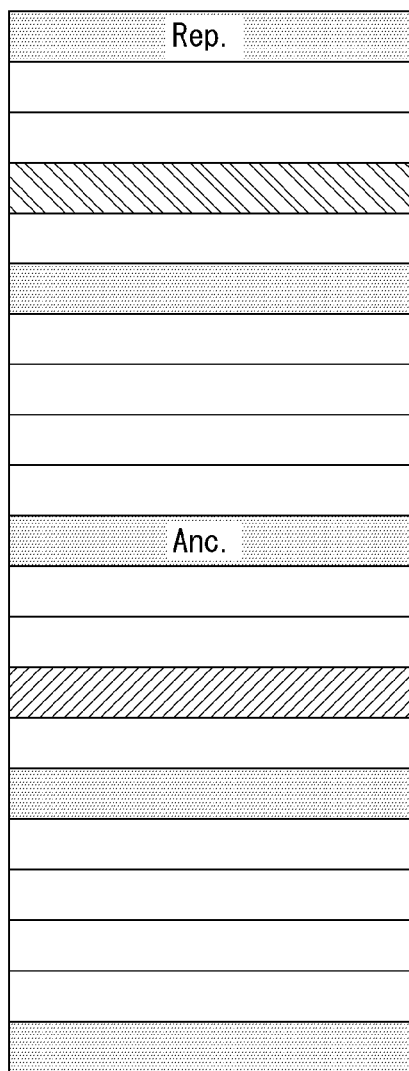
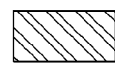 M-PRB (1302)
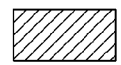 Additional PRB (1304)
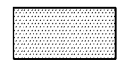 Anchor-type PRB (1306)
 Anchor PRB (1308)
 Representative PRB (1310)

METHOD FOR TRANSMITTING/RECEIVING DATA IN WIRELESS COMMUNICATION SYSTEM SUPPORTING NARROW-BAND INTERNET OF THINGS, AND APPARATUS FOR SAME

CROSS-REFERENCE TO RELATED APPLICATION

This application is the National Stage filing under 35 U.S.C. 371 of International Application No. PCT/KR2017/008647, filed on Aug. 9, 2017, which claims the benefit of U.S. Provisional Application No. 62/372,323, filed on Aug. 9, 2016, U.S. Provisional Application No. 62/372,324, filed on Aug. 9, 2016, U.S. Provisional Application No. 62/373,374, filed on Aug. 11, 2016, U.S. Provisional Application No. 62/385,252, filed on Sep. 9, 2016, U.S. Provisional Application No. 62/396,835, filed on Sep. 20, 2016, U.S. Provisional Application No. 62/400,645, filed on Sep. 28, 2016, U.S. Provisional Application No. 62/400,647, filed on Sep. 28, 2016, and U.S. Provisional Application No. 62/405,266, filed on Oct. 7, 2016, the contents of which are all hereby incorporated by reference herein in their entirety.

TECHNICAL FIELD

The present invention relates to a wireless communication system supporting NarrowBand-Internet of Things (NB-IoT) and more specifically, a method for transmitting/receiving data with respect to multicast and/or broadcast transmission and a device supporting the method.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

The present specification proposes a method for transmitting/receiving data according to a Single Cell-Point to Multipoint (SC-PtM) scheme in a wireless communication system supporting NarrowBand-Internet of Things (NB-IoT).

More specifically, the present specification proposes a method for transmitting/receiving a multicast signal and/or channel by using a PRB different from the PRB (i.e., a comp-on PRB, unicast PRB, paging PRB, or random access PRB) configured for transmission of legacy NB-IoT.

Also, the present specification proposes a method for transmitting/receiving a multicast signal and/or channel by using a PRB which is the same as the PRB configured for transmission of legacy NB-IoT.

Also, the present specification proposes a method for notifying a change of a Multicast Control Channel (MCCH).

Also, the present specification proposes a method for transmitting, through a plurality of PRBs, a downlink control channel which transmits control information of an MCCH.

Also, the present specification proposes a method for configuring the number of repetitions of a multicast signal and/or channel (i.e., a coverage enhancement level).

Also, the present specification proposes a method for receiving a specific signal and/or channel according to the priority when a multicast signal and/or channel overlaps a signal and/or channel used in the existing NB-IoT.

Technical objects to be achieved by the present invention are not limited to those described above, and other technical objects not mentioned above may also be clearly understood from the descriptions given below by those skilled in the art to which the present invention belongs.

Technical Solution

The present specification proposes a method for transmitting and receiving data in a wireless communication system supporting NarrowBand-Internet of Things (NB-IoT). The method performed by a UE comprises receiving a first Narrowband Physical Downlink Control Channel (NPDCCH) through a first search space, wherein the first NPDCCH includes first control information for scheduling a first Narrowband Physical Downlink Shared Channel (NPDSCH) carrying a Single Cell-Multicast Control Channel (SC-MCCH); receiving the first NPDSCH based on the first control information; receiving a second NPDCCH through a second search space by using a group identifier acquired through the SC-MCCH, wherein the second NPDCCH includes second control information for scheduling a second NPDSCH carrying a Single Cell-Multicast Traffic Channel (SC-MTCH); receiving the second NPDSCH based on the second control information; and when a time period configured for at least one of a third NPDCCH or a third NPDSCH overlaps at least one of the first search space, a time period configured for the first NPDSCH, the second search space, or a time period configured for the second NPDSCH, preferentially receiving at least one of the third NPDCCH or the third NPDSCH, wherein the third NPDCCH and the third NPDSCH are channels configured for either paging or random access.

Also, in the method of the present specification, the first search space includes a search space monitored by using a single cell identifier, and the second search space includes a search space monitored by using the group cell identifier.

Also, in the method of the present specification, when the third NPDCCH and the third NPDSCH are configured for paging, a time period configured for the third NPDCCH includes a search space monitored by using a paging identifier, and when the third NPDCCH and the third NPDSCH are configured for random access, a time period configured for the third NPDCCH includes a search space monitored by using a cell identifier.

Also, the method of the present specification further comprises receiving a system information block including carrier configuration information representing a carrier through which the first NPDCCH and the first NPDSCH are transmitted.

Also, in the method of the present specification, the first control information further includes information related to a change notification for the SC-MCCH.

Also, in the method of the present specification, the information related to the change notification for the SC-MCCH is composed of 1 bit.

Also, the method of the present specification may further comprise receiving system information including configuration information for the number of repetitions of at least one of the first PDCCH, the first PDSCH, the second PDCCH, or the second PDSCH, wherein the number of repetitions is configured in a cell-specific manner.

Also, the method of the present specification further comprises receiving system information including configuration information about the number of repetitions of at least one of the second PDCCH or the second PDSCH, wherein the number of repetitions is configured according to the group identifier.

Also, in the method of the present specification, the first PDCCH, the first PDSCH, the second PDCCH, and the second PDSCH are transmitted through a carrier different from a carrier through which a synchronization signal and a Physical Broadcast Channel (PBCH) are transmitted.

Also, in the method of the present specification, the first control information is downlink control information corresponding to Downlink Control Information (DCI) format N2, and the second control information is downlink control information corresponding to DCI format N1.

Also, in the method of the present specification, the third NPDCCH includes third control information for scheduling the third NPDSCH, and the third control information is composed of a number of information bits different from the number of information bits of at least one of the first control information or the second control information.

Also, the present specification proposes a User Equipment (UE) transmitting and receiving data in a wireless communication system supporting NarrowBand-Internet of Things (NB-IoT). The UE comprises a transceiver for transmitting and receiving a radio signal; and a processor connected functionally to the transmitting and receiving unit, wherein the processor is configured to receive a first Narrowband Physical Downlink Control Channel (NPDCCH) through a first search space, wherein the first NPDCCH includes first control information for scheduling a first Narrowband Physical Downlink Shared Channel (NPDSCH) carrying a Single Cell-Multicast Control Channel (SC-MCCH); receive the first NPDSCH based on the first control information; receive a second NPDCCH through a second search space by using a group identifier acquired through the SC-MCCH, wherein the second NPDCCH includes second control information for scheduling a second NPDSCH carrying a Single Cell-Multicast Traffic Channel (SC-MTCH); receive the second NPDSCH based on the second control information; and when a time period configured for at least one of a third NPDCCH or a third NPDSCH overlaps at least one of the first search space, a time period configured for the first NPDSCH, the second search space, or a time period configured for the second NPDSCH, preferentially receiving at least one of the third NPDCCH or the third NPDSCH, wherein the third NPDCCH and the third NPDSCH are channels configured for either paging or random access.

Also, in the UE of the present specification, the first search space includes a search space monitored by using a single cell identifier, and the second search space includes a search space monitored by using the group cell identifier.

Also, in the UE of the present specification, when the third NPDCCH and the third NPDSCH are configured for paging, a time period configured for the third NPDCCH includes a search space monitored by using a paging identifier, and when the third NPDCCH and the third NPDSCH are configured for random access, a time period configured for the third NPDCCH includes a search space monitored by using a cell identifier.

Also, in the UE of the present specification, wherein the carrier configuration information representing a specific carrier is carried through higher layer signaling configured according to the group identifier.

Also, in the UE of the present specification, the processor is controlled to receive system information block including carrier configuration information representing a carrier through which the first NPDCCH and the first NPDSCH are transmitted.

Also, in the UE of the present specification, the first control information further includes information related to a change notification for the SC-MCCH.

Also, in the UE of the present specification, the information related to the change notification for the SC-MCCH is composed of 1 bit.

Also, in the UE of the present specification, the first control information is downlink control information corresponding to Downlink Control Information (DCI) format N2, and the second control information is downlink control information corresponding to DCI format N1.

Also, in the UE of the present specification, the third control information is composed of a number of information bits different from the number of information bits of at least one of the first control information or the second control information.

Advantageous Effects

According to an embodiment of the present invention, an NB-LTE (i.e. NB-IoT) system, of which the time and frequency resources are limited compared with the existing LTE system, may also support transmission and reception of a multicast or broadcast signal and/or channel.

Also, according to an embodiment of the present invention, since scheduling information about a specific channel is carried in a data channel region rather than a control channel region, efficient scheduling may be performed in terms of resources.

Also, according to an embodiment of the present invention, since a plurality of frequency resources (i.e. carriers) may be configured, through which a signal and/or channel related to a multicast traffic channel may be transmitted, efficient multicast transmission may be performed in terms of resources.

Also, according to an embodiment of the present invention, in an NB-IoT system limited in terms of resources, when an existing signal and/or channel overlaps a multicast or broadcast signal and/or channel, a specific signal and/or channel is received according to the priority, thereby preventing a case where a UE from fails to receive all of transmitted signals and/or channels.

Also, according to an embodiment of the present invention, as the priority is preconfigured for a signal and/or channel, limited resources available in the NB-IoT (time resources and/or frequency resources) may be utilized in an efficient manner.

The technical effects of the present invention are not limited to the technical effects described above, and other technical effects not mentioned herein may be understood to those skilled in the art to which the present invention belongs from the description below.

DESCRIPTION OF DRAWINGS

The accompanying drawings, which are included herein as a part of the description for help understanding the present invention, provide embodiments of the present invention, and describe the technical features of the present invention with the description below.

FIG. 4 illustrates a structure of uplink subframe in a wireless communication system to which the present invention may be applied.

FIG. 7 illustrates one example of an operation system of an NB LTE system to which a method proposed by the present specification may be applied.

FIG. 13 illustrates another example of a method for configuring a PRB in an NB-LTE (i.e. NB-IoT) system to which a method proposed by the present invention may be applied.

MODE FOR INVENTION

Figure 1:
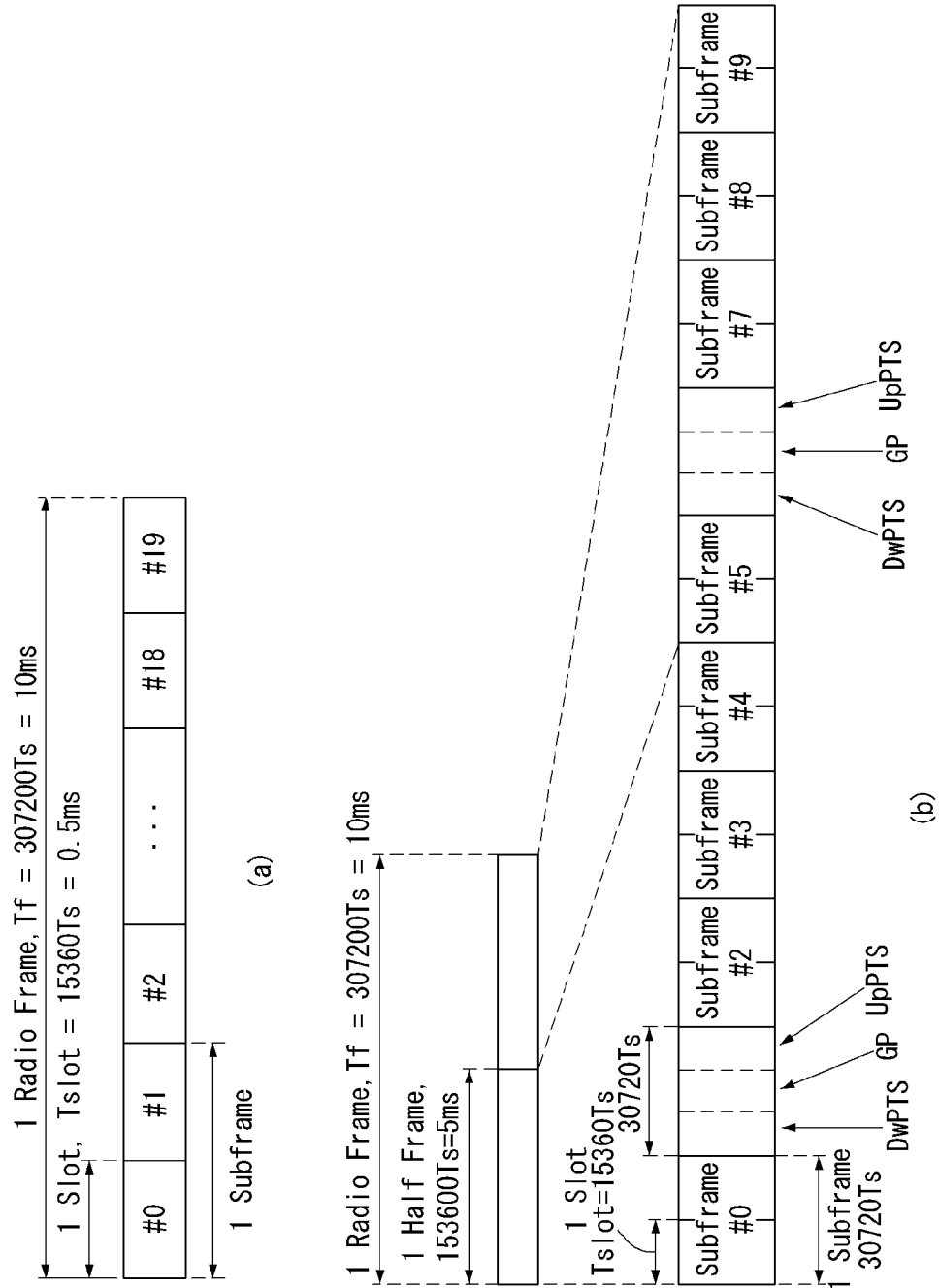
FIG. 1 illustrates the structure of a radio frame in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2. A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and an Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
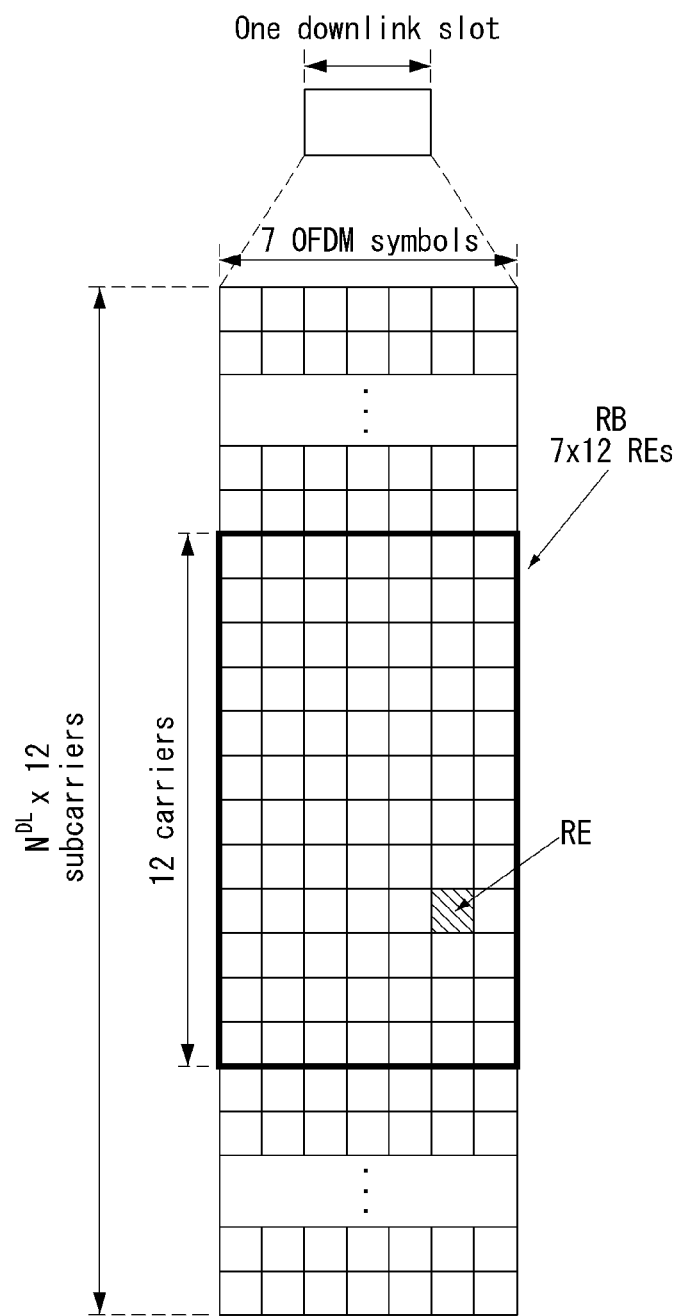
FIG. 2 is a diagram illustrating a resource grid for a downlink slot in a wireless communication system to which the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

Figure 3:
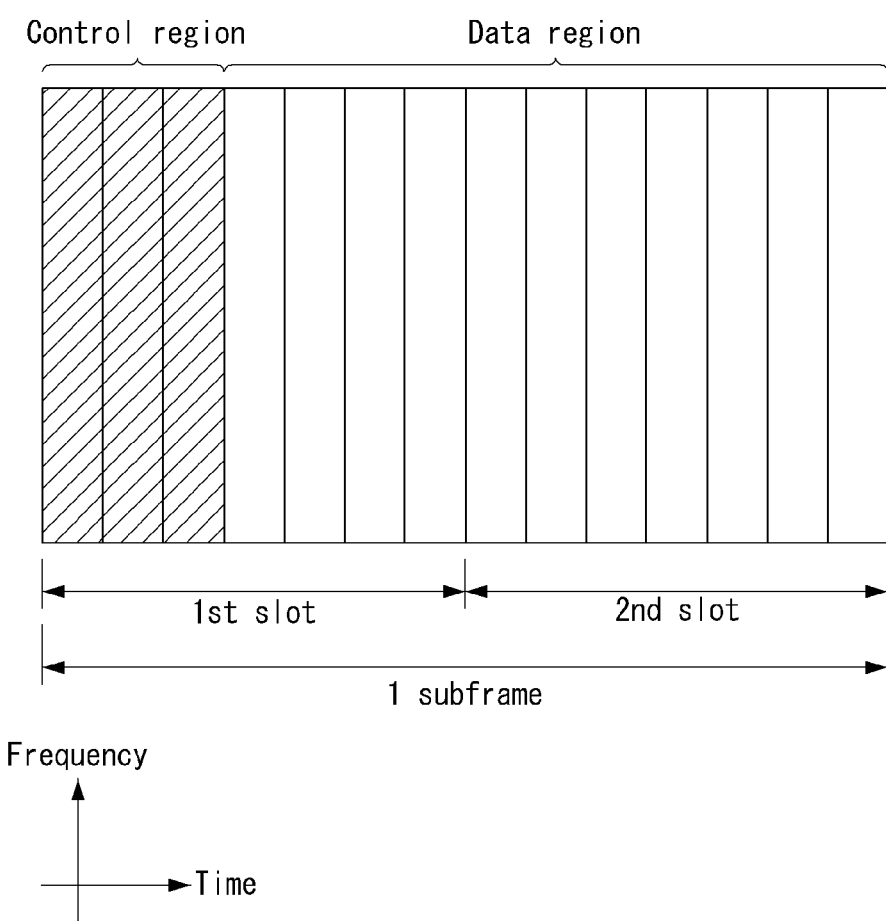
FIG. 3 illustrates a structure of downlink subframe in a wireless communication system to which the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to a UE and attaches a Cyclic Redundancy Check (CRC) to the control information. A unique identifier (which is called a Radio Network Temporary Identifier (RNTI)) is masked to the CRC depending on the owner or use of a PDCCH. If the PDCCH is intended for a specific UE, an identifier unique to the UE, for example, a Cell-RNTI (C-RNTI) may be masked to the CRC. If the PDCCH is intended for a paging message, a paging indication identifier, for example, a Paging-RNTI (P-RNTI) may be masked to the CRC. If the PDCCH is intended for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by a UE.

An EPDCCH (Enhanced PDCCH) carries UE-specific signaling. An EPDCCH is disposed at a Physical Resource Block (PRB) determined in a UE-specific manner. In other words, as described above, a PDCCH may be transmitted from up to three OFDM symbols in a first slot of a subframe, but an EPDCCH may be transmitted f a non-PDCCH resource region. The starting point (i.e., symbol) at which an EPDCCH is started in a subframe may be set to a UE through higher layer signaling (for example, RRC signaling).

An EPDCCH may carry a transmission format related to the DL-SCH; resource allocation and HARQ information; transmission format related to the UL-SCH; resource allocation information related to the Sidelink Shared Channel (SL-SCH) and Physical Sidelink Control Channel (PSCCH). Multiple EPDCCHs may be supported, and a UE may monitor a set of EPCCHs.

An EPDCCH may be transmitted by using one or more consecutive Enhanced CCEs (ECCEs), and for each EPDCCH format, the number of ECCEs for each EPDCCH may be determined.

Each ECCE may comprise a plurality of Enhanced Resource Element Groups (EREGs). An EREG is used for defining mapping ECCEs to REs. For each PRB pair, 16 EREGs may be defined. In each PRB pair, except for those REs carrying a DMRS, all of the REs are numbered ranging from 0 to 15 in the increasing order of frequency and then in the increasing order of time.

The UE may monitor a plurality of EPDCCHs. For example, one or two EPDCCH sets may be configured within one PRB pair for which the UE monitors EPDCCH transmission.

As a different number of ECCEs are merged together, different coding rates may be implemented for an EPOCH. An EPOCH may employ localized transmission or distributed transmission, according to which mapping of the ECCE to an RE within a PRB may be varied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Carrier Appreciation in General

Communication environments considered in the embodiments of the present invention includes all of multi-carrier supporting environments. In other words, a multi-carrier system or a carrier aggregation system according to the present invention refers to the system utilizing aggregation of one or more component carriers having bandwidth narrower than target bandwidth to establish a broadband communication environment.

A multi-carrier according to the present invention refers to aggregation of carriers, and the carrier aggregation in this sense refers to not only the aggregation of contiguous carriers but also the aggregation of non-contiguous carriers. Also, the numbers of component carriers aggregated for downlink and uplink transmission can be set differently from each other. The case where the number of downlink component carriers (hereinafter, it is called 'DL CC') is the same as the number of uplink component carriers (hereinafter, it is called 'UL CC') is called symmetric aggregation, whereas it is called asymmetric aggregation otherwise. The term of carrier aggregation may be used interchangeably with bandwidth aggregation and spectrum aggregation.

Carrier aggregation composed of a combination of two or more component carriers is intended to support bandwidth of up to 100 MHz for the case of the LTE-A system. When one or more carriers having narrower bandwidth than target bandwidth are combined, the bandwidth of the carrier to be combined may be limited to the bandwidth defined by an existing system to maintain compatibility with the existing IMT system. For example, while the existing system supports bandwidth of 1.4, 3, 5, 10, 15, and 20 MHz, the 3GPP LTE-A system may support bandwidth larger than 20 MHz by using a combination of the predefined bandwidth to maintain compatibility with the existing system. Also, a carrier aggregation system according to the present invention may support carrier aggregation by defining new bandwidth independently of the bandwidth used in the existing system.

The LTE-A system introduces a concept of a cell for management of radio resources.

The carrier aggregation environment may be referred to as a multiple cell environment. A cell is defined as a combination of a pair of a DL CC and an UL CC, but the UL CC is not an essential element. Therefore, a cell may be composed of downlink resources only or a combination of downlink and uplink resources. In case a particular UE is linked to only one configured serving cell, one DL CC and one UL CC are employed. However, if the particular UE is linked to two or more configured serving cells, as many DL CCs as the number of cells are employed while the number of UL CCs may be equal to or smaller than the number of DL CCs.

Meanwhile, the DL CCs and the UL CCs may be composed in the opposite way. In other words, in case a particular UE is linked to a plurality of configured serving cells, a carrier aggregation environment which has more UL CCs than DL CCs may also be supported. In other words, carrier aggregation may be understood as a combination of two or more cells having different carrier frequencies (center frequencies of the cells). At this time, the term of 'cell' should be distinguished from the 'cell' usually defined as a region covered by an eNB.

The LTE-A system defines a primary cell (PCell) and a secondary cell (SCell). A PCell and an SCell may be used as a serving cell. A UE being in an RRC_CONNECTED state but not being configured for carrier aggregation or not supporting carrier aggregation may be linked to one or more serving cells, and the entire serving cells include a PCell and one or more SCells.

A serving cell (PCell and SCell) may be configured through an RRC parameter. PhysCellId is a physical layer identifier of a cell, having an integer value ranging from 0 to 503. SCellIndex is a short identifier used for identifying an SCell, having an integer value ranging from 1 to 7. ServCellIndex is a short identifier used for identifying a serving cell (PCell or SCell), having an integer value ranging from 0 to 7. The value of 0 is applied to a PCell, and SCellIndex is pre-assigned to be applied to an SCell. In other words, the cell which has the smallest cell ID (or cell index) of ServCellIndex becomes the PCell.

A PCell refers to a cell operating on a primary frequency (or a primary CC). A PCell may be used for an UE to perform an initial connection establishment process or a connection re-establishment process; a PCell may refer to the cell indicated during a handover process. Also, a PCell refers to the cell which plays a central role for control-related communication among configured serving cells in a carrier aggregation environment. In other words, a UE is capable of receiving and transmitting a PUCCH only through its own PCell; also, the UE may obtain system information or modify a monitoring procedure only through the PCell. The Evolved Universal Terrestrial Radio Access Network (E-UTRAN) may change only the PCell by using an RRC connection reconfiguration message (RRCConnectionReconfiguration) of a higher layer including mobility control information (mobilityControlInfo) so that the UE supporting carrier aggregation environments may carry out a handout procedure.

An SCell refers to a cell operating on a secondary frequency (or a secondary CC). For a particular UE, only one PCell is allocated, but one or more SCells may be allocated. An SCell may be composed after configuration for an RRC connection is completed and may be used to provide additional radio resources. A PUCCH does not exist in the remaining cells except for PCells among the serving cells configured for a carrier aggregation environment, i.e., SCells. When adding an SCell to a UE supporting a carrier aggregation environment, the E-UTRAN may provide all of the system information related to the operation of a cell in the RRC_CONNECTED state through a dedicated signal. Modification of system information may be controlled according to release and addition of a related SCell, and at this time, an RRC connection reconfiguration (RRCConnectionReconfiguration) message of a higher layer may be used. The E-UTRAN, instead of broadcasting a signal within an SCell, may carry out dedicated signaling using parameters different for each UE.

After the initial security activation process is started, the E-UTRAN may form a network including one or more SCells in addition to a PCell defined in the initial step of a connection establishment process. In a carrier aggregation environment, a PCell and an SCell may operate as an independent component carrier. In the embodiment below, a primary component carrier (PCC) may be used in the same context as the PCell, while a secondary component carrier (SCC) may be used in the same context as the SCell.

Figure 5:
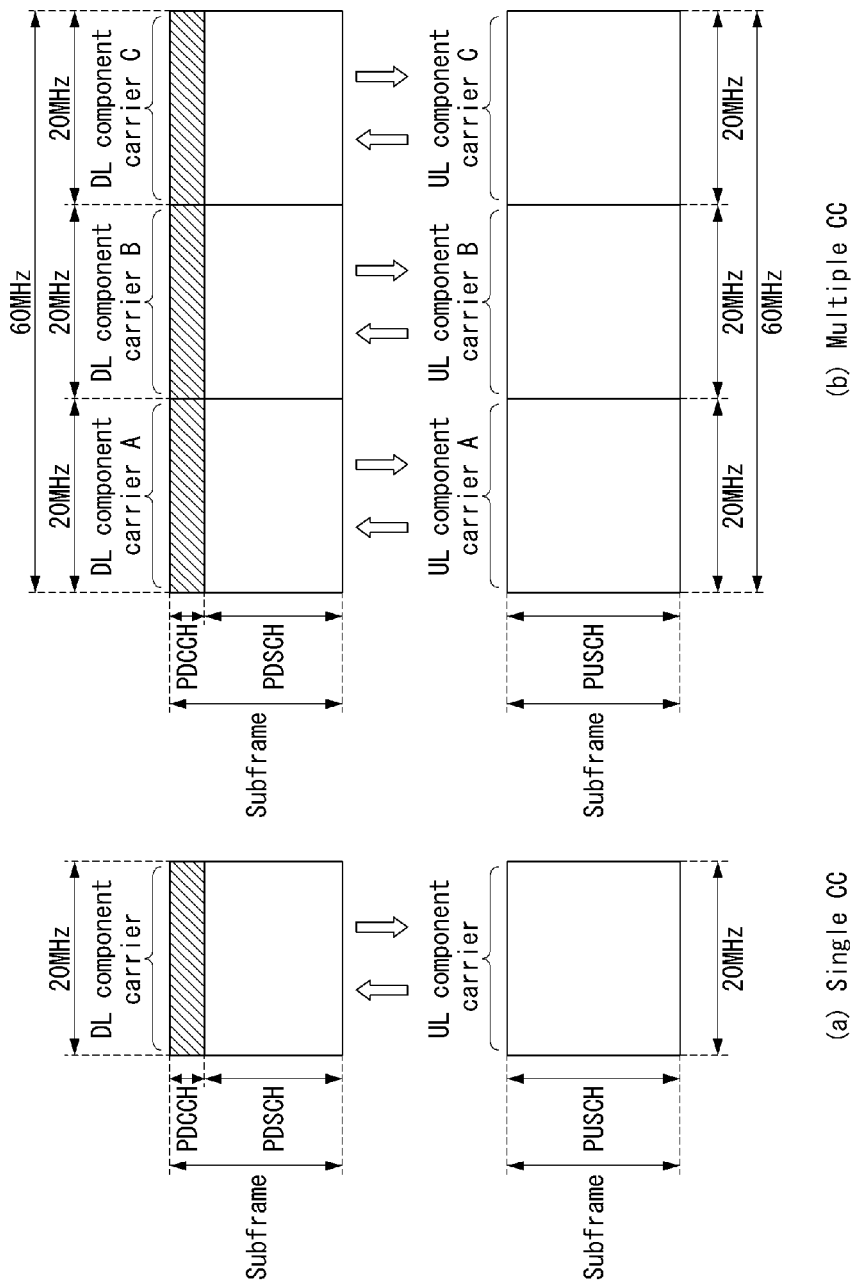
FIG. 5 illustrates one example of a component carrier and carrier aggregation in a wireless communication system to which the present invention may be applied.

FIG. 5 illustrates one example of a component carrier and carrier aggregation in a wireless communication system to which the present invention can be applied.

FIG. 5(a) shows a single carrier structure defined in the LTE system. Two types of component carriers are used: DL CC and UL CC. A component carrier may have frequency bandwidth of 20 MHz.

FIG. 5(b) shows a carrier aggregation structure used in the LTE A system. FIG. 5(b) shows a case where three component carriers having frequency bandwidth of 20 MHz are aggregated. In this example, 3 DL CCs and 3 UL CCs are employed, but the number of DL CCs and UL CCs is not limited to the example. In the case of carrier aggregation, the UE is capable of monitoring 3 CCs at the same time, capable of receiving a downlink signal/data and transmitting an uplink signal/data.

If a particular cell manages N DL CCs, the network may allocate M (M≤N) DL CCs to the UE. At this time, the UE may monitor only the M DL CCs and receive a DL signal from the M DL CCs. Also, the network may assign priorities for L (L≤M≤N) DL CCs so that primary DL CCs may be allocated to the UE; in this case, the UE has to monitor the L DL CCs. This scheme may be applied in the same manner to uplink transmission.

Linkage between a carrier frequency of downlink resources (or DL CC) and a carrier frequency of uplink resources (or UL CC) may be designated by a higher layer message such as an RRC message or system information.

For example, according to the linkage defined by system information block type 2 (SIB2), a combination of DL resources and UL resources may be determined. More specifically, the linkage may refer to a mapping relationship between a DL CC through which a PDCCH carrying an UL grant is transmitted and an UL CC that uses the UL grant; or a mapping relationship between a DL CC (or an UL CC) through which data for HARQ signal are transmitted and an UL CC (or a DL CC) through which a HARQ ACK/NACK signal is transmitted.

Figure 6:
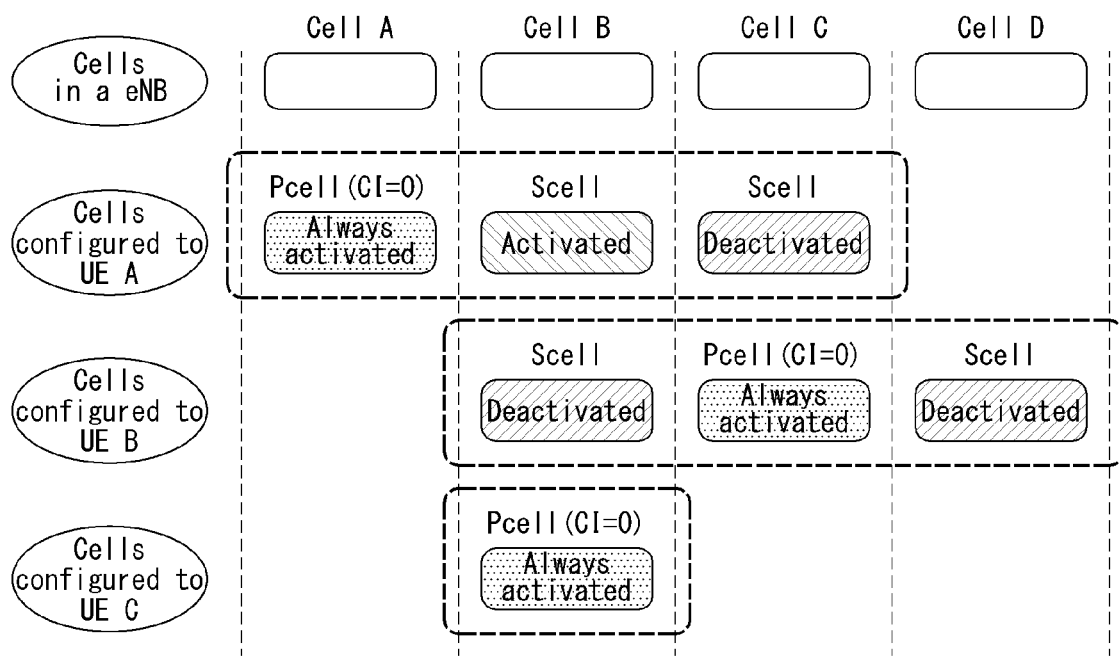
FIG. 6 illustrates an example where a system supporting carrier aggregation distinguishes cells.

FIG. 6 illustrates an example where a system supporting carrier aggregation distinguishes cells.

Referring to FIG. 6, a configured cell is a cell which is configured for carrier aggregation based on a measurement report among cells of an eNB and is configured for each UE as shown in FIG. 5. A configured cell may reserve a resource for ack/nack transmission in advance with respect to PDSCH transmission. An activated cell is a cell configured to actually transmit a PDSCH/PUSCH among the configured cells, which performs Channel State Information (CSI) reporting for PDSCH/PUSCH transmission and Sounding Reference Signal (SRS) transmission. A de-activated cell is a cell configured not to perform PDSCH/PUSCH transmission by a command from the eNB or timer operation, which may stop CSI reporting and SRS transmission.

Operation System of NB-LTE System

FIG. 7 illustrates one example of an operation system of an NB LTE system to which a method proposed by the present specification may be applied.

More specifically, FIG. 7(a) illustrates an in-band system, FIG. 7(b) illustrates a guard-band system, and FIG. 7(c) illustrates a stand-alone system.

The in-band system may be denoted as in-band mode, guard-band system as guard-band mode, and stand-alone system as stand-alone mode.

The in-band system of FIG. 7(a) refers to a system or a mode which uses a specific one RB within the legacy LTE band for the NB-LTE (or LTE-NB) and may be operated by allocating part of resource blocks of a carrier in the LTE system.

FIG. 7(b) refers to a system or a mode which uses a reserved space for a guard band of the legacy LTE band for the NB-LTE and may be operated by allocating a guard-band of an LTE carrier not used as a resource block in the LTE system.

The legacy LTE band has a guard band spanning at least 100 kHz at the last portion of each LTE band.

To use a band of 200 kHz, two non-contiguous guard bands may be used.

The in-band system and the guard-band system uses a structure in which NB-LTE coexists within the legacy LTE band.

On the other hand, the standalone system of FIG. 7(c) refers to a system or a mode composed independently from the legacy LTE band and may be operated by separately allocating a frequency band (a re-allocated GSM carrier afterwards) used in the GERAN.

Figure 8:
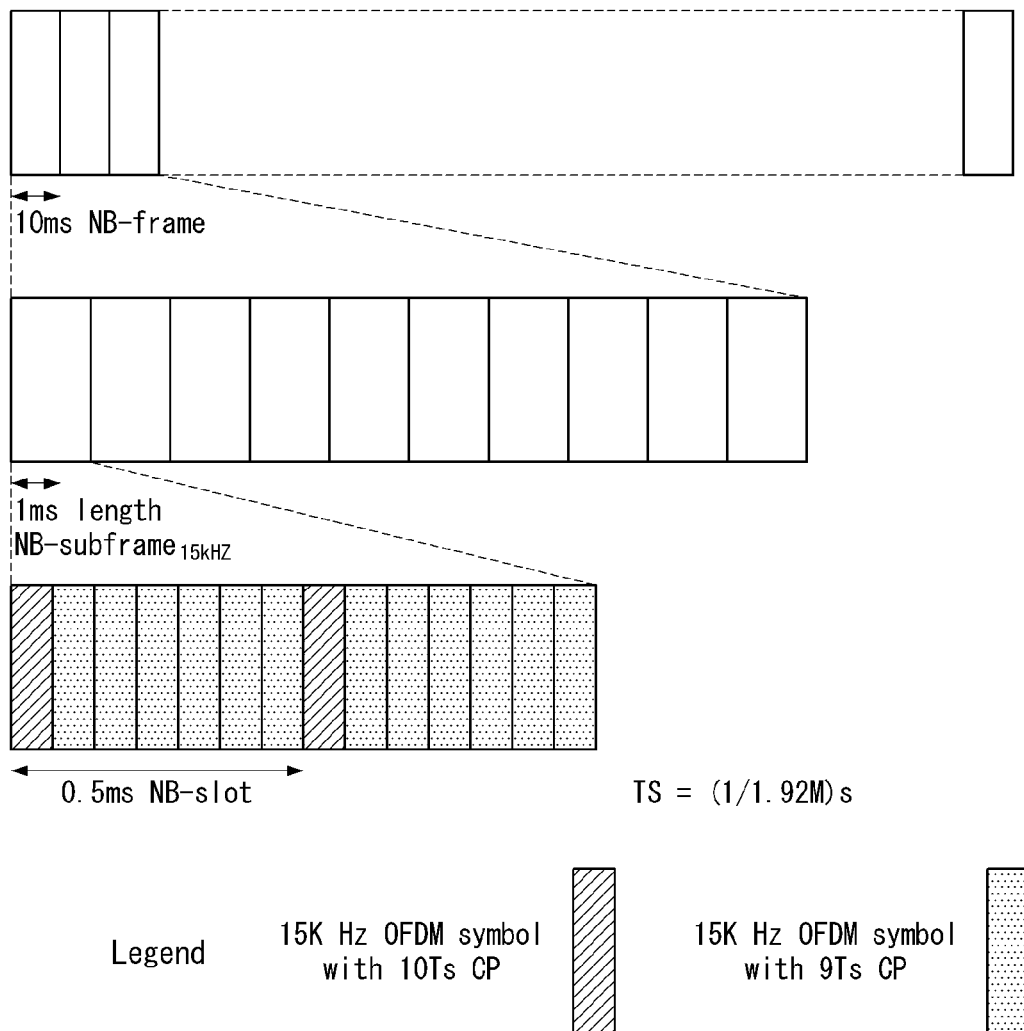
FIG. 8 illustrates one example of an NB frame structure having a 15 kHz subcarrier spacing to which a method proposed by the present specification may be applied.

FIG. 8 illustrates one example of an NB frame structure having a 15 kHz subcarrier spacing to which a method proposed by the present specification may be applied.

As shown in FIG. 8, an NB frame structure having a 15 kHz subcarrier spacing may be regarded as having the same frame structure of the legacy system (LTE system).

In other words, a 10 ms NB frame comprises ten 1 ms NB subframes, and a 1 ms NB subframe comprises two 0.5 ms NB slots.

Also, a 0.5 ms NB slot comprises 7 OFDM symbols.

Figure 9:
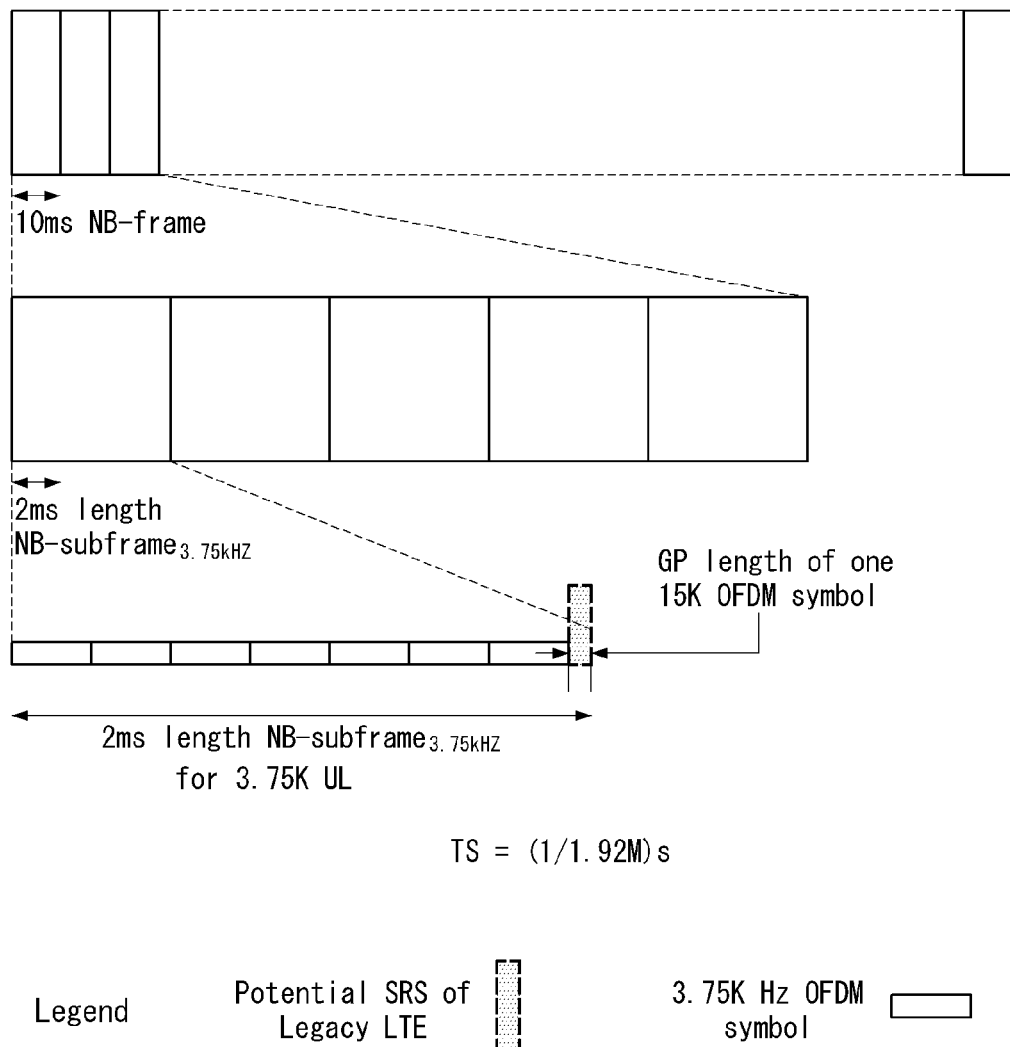
FIG. 9 illustrates one example of an NB frame structure having a 3.75 kHz subcarrier spacing to which a method proposed by the present specification may be applied.

FIG. 9 illustrates one example of an NB frame structure having a 3.75 kHz subcarrier spacing to which a method proposed by the present specification may be applied.

Referring to FIG. 9, a 10 ms NB frame comprises five 2 ms NB subframes, and a 2 ms NB subframes comprises seven OFDM symbols and one guard period (GP).

The 2 ms NB subframe may also be denoted as an NB slot or an NB resource unit (RU).

Figure 10:
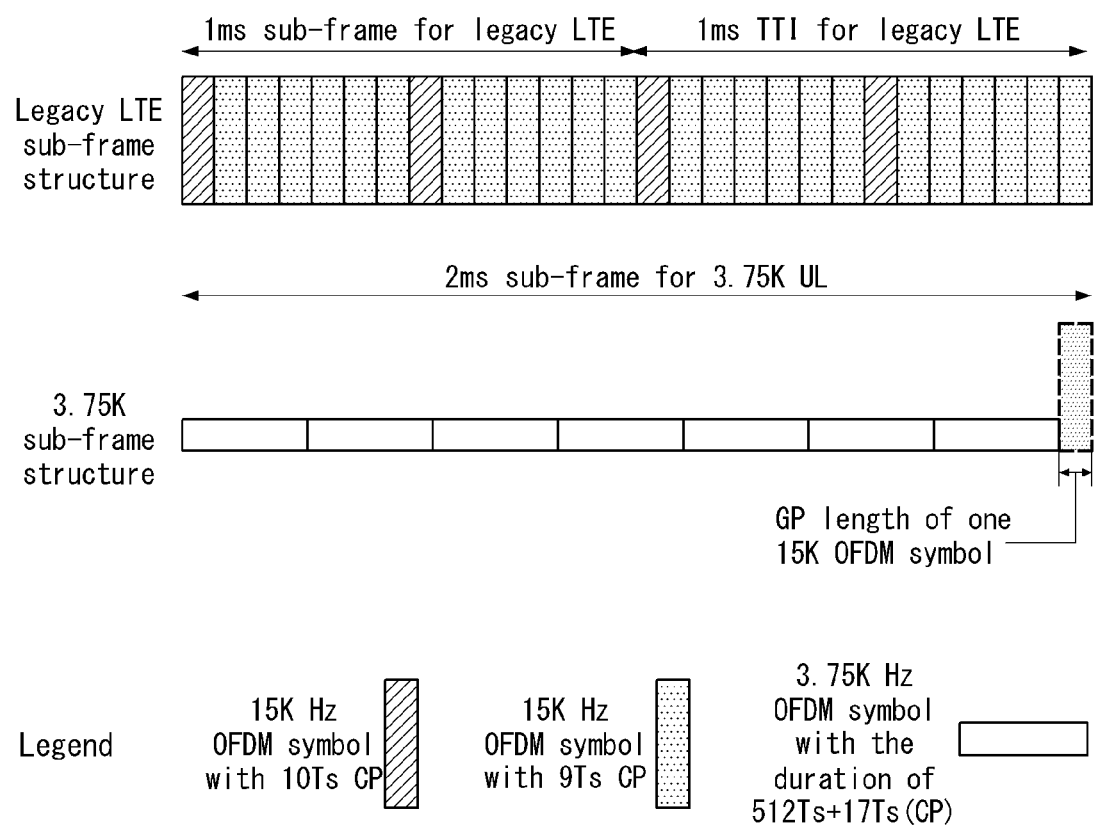
FIG. 10 illustrates one example of an NB frame structure having a 3.75 kHz subcarrier spacing to which a method proposed by the present specification may be applied.

FIG. 10 illustrates one example of an NB frame structure having a 3.75 kHz subcarrier spacing to which a method proposed by the present specification may be applied.

FIG. 10 illustrates a correspondence relationship between a legacy LTE subframe structure and a 3.75 kHz subframe.

With reference to FIG. 10, the 3.75 kHz subframe (2 ms) corresponds to two 1 ms subframes (or 1 ms TTIs) of the legacy LTE.

Single Cell Point-to-Multipoint (SC-PtM)

SC-PtM control information is provided on a specific logic channel (SC-MCCH, SC-Multicast Control Channel). SC-MCCH carries not only Multimedia Broadcast Multicast Service (MBMS) sessions but also an SC-PtM-Configuration message (i.e. SC-PtM configuration message) representing information about a scheduling window and a start offset when each session is scheduled (in other words, a scheduling period). Also, the SC-PtM configuration message provides information about neighbor cells transmitting MBMS sessions which are ongoing in the current cell. Also, a limited amount of SC-PtM control information is provided on the Broadcast Control Channel (BCCH). This is related primarily to the information needed to acquire the SC-MCCH.

According to the scheduling of the SC-MCCH, SC-MCCH information (i.e. information transmitted from messages transmitted through the SC-MCCH) is transmitted periodically by using a configurable repetition period. SC-MCCH transmission (and related radio resources) and the Modulation and Coding Scheme (MCS) are indicated on Physical Downlink Control Channel (PDCCH).

Also, in association with validity and notification of change of SC-MCCH information, change of the SC-MCCH occurs at specific radio frames. In other words, a concept of a modification period is used. Within a modification period, the same SC-MCCH information may be transmitted a number of times (based on the repetition period) as defined by the corresponding scheduling. At this time, the modification period boundaries may be defined by a system frame number (SFN). Here, the modification period may be configured by means of system information (for example, SIB 20 (i.e., SystemInformationBlockType 20)).

If the network changes the information of the SC-MCCH (or part of the SC-MCCH), the network notifies UEs about a change of the first subframe which may be used for SC-MCCH transmission at the repetition period. At this time, the Least Significant Bit (LSB) bit in the 8-bit bitmap indicates a change of the SC-MCCH when information notified to the UEs (i.e., change notification) is set to '1'. Upon receiving the change notification, a UE attempting to receive an MBMS service transmitted using SC-PtM may acquire new SC-MCCH information starting from the same subframe. In this case, the UE applies the previously acquired SC-MCCH information until new SC-MCCH information is acquired.

Also, an SC-PtM capable UE which receives or intends to receive a service via an SC-MBSFN Radio Bearer (SC-MRB) may apply an SC-PtM procedure and an MBMS interest indication procedure.

SC-MCCH Information Acquisition

A procedure for acquiring SC-MCCH information is as follows. In general, a UE applies an SC-MCCH information acquisition procedure to acquire SC-PtM control information broadcasted by the E-UTRAN. The procedure may be applied to an SC-PtM capable UE in the RRC_IDLE or RRC_CONNECTED state.

In association with initiation of SC-MCCH information acquisition, upon entering cell broadcasting system information (for example, SIB 20) (for example, due to power-on or UE mobility) and receiving a notification notifying that the SC-MCCH information has been changed, the UE attempting to receive an MBMS service via an SC-MRB has to apply the SC-MCCH information acquisition procedure. The UE receiving an MBMS service via an SC-MRB has to apply the SC-MCCH information acquisition procedure to acquire the SC-MCCH information corresponding to a service received at the start of each modification period.

Also, the SC-MCCH information acquisition procedure overwrites stored SC-MCCH information unless the procedure is explicitly specified. That is, delta configuration is not applicable for the SC-MCCH information, and if a field is absent in the SC-MCCH information, use of the corresponding field is stopped.

Acquisition of the SC-MCCH information by a UE is performed according to the following procedure. When the procedure (i.e. SC-MCCH information acquisition procedure) is triggered by an SC-MCCH change notification, an SC-PtM capable UE starts acquisition of an SC-PtM configuration message from a subframe which has received the change notification. At this time, the UE continues to use the previously received SC-MCCH information until new SC-MCCH information is acquired. Or, when the UE enters the cell broadcasting system information (for example, SIB 20), the UE acquires an SC-PtM configuration message at the next repetition period. Or, when the UE receives an MBMS service via an SC-MRB, the UE starts acquisition of an SC-PtM configuration message from the start of each modification period.

SC-PtM Radio Bearer Configuration

Configuration of an SC-PtM radio bearer is performed as follows. In general, an SC-PtM radio bearer configuration procedure is used by a UE to configure the Radio Link Control (RLC) layer, Medium Access Control (MAC) layer, and physical layer when reception of an SC-MRB transmitted from an SC-Multicast Traffic Channel (SC-MTCH) is started and/or stopped. At this time, the procedure is applied to a UE (SC-PtM capable UE) which is in the RRC_CONNECTED or RRC_IDLE state and interested to receive MBMS services via the SC-MRB.

At this time, if the UE is unable to receive an MBMS service via an SC-MRB due to capability limitation, higher layers may take an appropriate action such as terminating a lower priority unicast service.

In association with initiation of the SC-PtM radio bearer configuration procedure, the UE applies an SC-MRB establishment procedure to start receiving a session of an MBMS service of interest. For example, the procedure may be initiated when an MBMS session is started, when capability limitation of the UE, which inhibits receiving the corresponding service, is removed, when the UE has an interest in an MBMS service, or when the UE enters a cell which provides, via an SC-MRB, an MBMS service in which the UE has interest.

The UE stops receiving a session by applying an SC-MRB release procedure. For example, the procedure may be initiated when the MBMS session is stopped, when capability limitation inhibits reception of a related service, when the UE leaves a cell in which an SC-MRB is established, or when the UE loses interest in the MBMS service.

In association with establishment of an SC-MRB, an SC-PtM capable UE may perform the following operation when an SC-MRB is established. The UE establishes an RLC entity. Also, the UE configures an SC-MTCH logic channel which may be applied for the SC-MRB and instructs the MAC to receive a DL-SCH from a cell which has received an SC-PtM configuration message with respect to an MBMS service for which the SC-MRB has been established. At this time, the cell uses a Group Radio Network Temporary Identifier (G-RNTI) and sc-mtch-SchedulingInfo carried in the message with respect to the corresponding MBMS service. Also, the UE configures a physical layer which may be applied to the SC-MRB according to sc-mtch-InfoList (which is included in the SC-PtM configuration message). Also, the UE informs the higher layer about establishment of the SC-MRB by indicating the corresponding Temporary Mobile Group Identifier (TMGI) and a session ID.

Also, in association with release of the SC-MRB, when the SC-MRB is released, an SC-PtM capable UE releases not only a related MAC and physical layer configurations but also the RLC entity. Also, the UE informs the higher layer of release of the SC-MRB by indicating the corresponding TMGI and a session identifier.

The SIB 20 (i.e., system information block type 20) described as an example in the procedure above includes information required for acquiring control information related to transmission of an MBMS which employs SC-PtM. The SIB 20 may be as shown in Table 3 below.

Also, the sc-mcch-offset represents radio frames for which the SC-MCCH is scheduled together with sc-mcch-RepetitionPeriod. Also, the sc-mcch-FirstSubframe indicates the first subframe in which the SC-MCCH is scheduled. Also, the sc-mcch-RepetitionPeriod defines an interval between transmissions of SC-MCCH information in radio frames. At this time, value rf2 corresponds to two radio frames, and value rf4 corresponds to four radio frames.

Downlink control channel-related procedure in NB-IoT

In what follows, a procedure related to Narrowband Physical Downlink Control Channel (NPDCCH) used for NB-IoT will be described.

A UE has to monitor NPDCCH candidates (i.e., a set of NPDCCH candidates) according to the control information configured by higher layer signaling. Here, the monitoring may indicate attempting to decode individual NPDCCHs belonging to the set according to all of the monitored DCI formats. The set of NPDCCH candidates to monitor may be defined in terms of NPDCCH search spaces. In this case, the UE may perform monitoring using identifiers (for example, C-RNTI, P-RNTI, SC-RNTI, or G-RNTI) corresponding to the respective NPDCCH search spaces.

In this case, the UE needs to monitor one or more of the following search spaces: a) Type1-NPDCCH common search space, b) Type2-NPDCCH common search space, and c) NPDCCH UE-specific search space. At this time, the UE is not required to monitor the NPDCCH UE-specific search space and the Type1-NPDCCH common search space simultaneously. Also, the UE is not required to monitor the NPDCCH UE-specific search space and the Type2-NPDCCH common search space simultaneously. Also, the

TABLE 3

```
-- ASN1START
SystemInformationBlockType20-r13 ::=    SEQUENCE {
    sc-mcch-RepetionPeriod-r13          ENUMERATED   {rf2,   rf4,   rf8,
rf16, rf32, rf64, rf128, rf256},
    sc-mcch-Offset-r13                       INTEGER (0..10),
    sc-mcch-FirstSubframe-r13           INTEGER (0..9),
    sc-mcch-duration-r13                INTEGER                 (2..9)
    OPTIONAL,
    sc-mcch-ModificationPeriod-r13      ENUMERATED   {rf2,   rf4,   rf8,
rf16, rf32, rf64, rf128, rf256,
        rf512, rf1024, r2048, rf4096, rf8192, rf16384,
                            rf8192, rf16384, rf32768, rf65536},
    lateNonCriticalExtension                 OCTET STRING
                   OPTIONAL,
    ...
}
-- ASN1STOP
```

In Table 3, the sc-mcch-ModificationPeriod defines periodically appearing boundaries, i.e. radio frames for which SFN mod sc-mcch-ModificationPeriod=0. The contents carried by the SC-MCCH may differ only when there is at least one such boundary among them. At this time, the value rf2 corresponds to two radio frames, and value rf4 corresponds to four radio frames.

Also, the sc-mcch-duration represents duration for which an SC-MCCH may be scheduled in non-MBSFN subframes. At this time, the duration starts from the subframe indicated by sc-mcch-FirstSubframe. Absence of this information element indicates that the SC-MCCH is scheduled only in the subframe indicated by sc-mcch-FirstSubframe.

UE is not required to monitor the Type1-NPDCCH common search space and the Type2-NPDCCH common search space simultaneously.

The NPDCCH search spaces at aggregation and repetition levels are defined by a set of NPDCCH candidates. Here, each NPDCCH candidate is repeated in R consecutive NB-IoT downlink subframes except for subframes used for transmission of System Information (SI) messages starting from the subframe k.

In the case of the NPDCCH UE-specific search space, the aggregation and repetition levels defining the search space and the corresponding NPDCCH candidates being monitored are listed in Table 4, where the $R_{MAX}$ value is replaced with the parameter al-Repetition-USS configured by the higher layer.

TABLE 4

| $R_{max}$ | R | NCCE indices of monitored NPDCCH candidates | |
|---|---|---|---|
| | | L' = 1 | L' = 2 |
| 1 | 1 | {0}, {1} | {0, 1} |
| 2 | 1 | {0}, {1} | {0, 1} |
| | 2 | — | {0, 1} |
| 4 | 1 | — | {0, 1} |
| | 2 | — | {0, 1} |
| | 4 | — | {0, 1} |
| >=8 | $R_{max}/8$ | — | {0, 1} |
| | $R_{max}/4$ | — | {0, 1} |
| | $R_{max}/2$ | — | {0, 1} |
| | $R_{max}$ | — | {0, 1} |

Note 1:
{x}, {y} denotes NPDCCH format 0 candidate of NCCE index 'x' and NPDCCH format 0 candidate of NCCE index 'y'.
Note 2:
{x, y} denotes NPDCCH format 1 candidate corresponding to NCCE indexes 'x' and 'y'.

In the case of the Type 1-NPDCCH common search space, the aggregation and repetition levels defining the search spaces and the NPDCCH candidates being monitored are listed in Table 5, where the $R_{MAX}$ value is replaced with the parameter al-Repetition-CSS-Paging configured by the higher layer.

TABLE 5

| $R_{max}$ | R | NCCE indices of monitored NPDCCH candidates | |
|---|---|---|---|
| | | L' = 1 | L' = 2 |
| 1 | 1 | — | {0, 1} |
| 2 | 1, 2 | — | {0, 1} |
| 4 | 1, 2, 4 | — | {0, 1} |
| 8 | 1, 2, 4, 8 | — | {0, 1} |
| 16 | 1, 2, 4, 8, 16 | — | {0, 1} |
| 32 | 1, 2, 4, 8, 16, 32 | — | {0, 1} |
| 64 | 1, 2, 4, 8, 16, 32, 64 | — | {0, 1} |
| 128 | 1, 2, 4, 8, 16, 32, 64, 128 | — | {0, 1} |
| 256 | 1, 4, 8, 16, 32, 64, 128, 256 | — | {0, 1} |
| 512 | 1, 4, 16, 32, 64, 128, 256, 512 | — | {0, 1} |
| 1024 | 1, 8, 32, 64, 128, 256, 512, 1024 | — | {0, 1} |
| 2048 | 1, 8, 64, 128, 256, 512, 1024, 2048 | — | {0, 1} |

Note 1:
{x}, {y} denotes NPDCCH format 0 candidate of NCCE index 'x' and NPDCCH format 0 candidate of NCCE index 'y'.
Note 2:
{x, y} denotes NPDCCH format 1 candidate corresponding to NCCE indexes 'x' and 'y'.

In the case of the Type 2-NPDCCH common search space, the aggregation and repetition levels defining the search spaces and the NPDCCH candidates being monitored are in Table 6, where the $R_{MAX}$ value is replaced with the parameter npdcch-MaxNumRepetitions-RA configured by the higher layer.

TABLE 6

| $R_{max}$ | R | NCCE indices of monitored NPDCCH candidates | |
|---|---|---|---|
| | | L' = 1 | L' = 2 |
| 1 | 1 | — | {0, 1} |
| 2 | 1 | — | {0, 1} |
| | 2 | — | {0, 1} |
| 4 | 1 | — | {0, 1} |
| | 2 | — | {0, 1} |
| | 4 | — | {0, 1} |
| >=8 | $R_{max}/8$ | — | {0, 1} |
| | $R_{max}/4$ | — | {0, 1} |
| | $R_{max}/2$ | — | {0, 1} |
| | $R_{max}$ | — | {0, 1} |

Note 1:
{x}, {y} denotes NPDCCH format 0 candidate of NCCE index 'x' and NPDCCH format 0 candidate of NCCE index 'y'.
Note 2:
{x, y} denotes NPDCCH format 1 candidate corresponding to NCCE indexes 'x' and 'y'.

At this time, the locations of the starting subframe k are given by $k=k_b$. Here, $k_b$ indicates the b-th consecutive NB-IoT downlink subframe from subframe k0, b is u×R, and u ranges 0, 1, . . . , $(R_{MAX}/R)-1$. Also, subframe k0 indicates a subframe satisfying the condition of Eq. 1.

$$(10n_f + \lfloor n_s/2 \rfloor) \mod T = \alpha_{offset} \cdot T_r \text{ where } T = R_{max} \cdot G \quad \text{[Eq. 1]}$$

In the case of the NPDCCH UE-specific search space, G appearing in Eq. 1 is given by the higher layer parameter nPDCCH-startSF-UESS, and $\alpha_{offset}$ is given by the higher layer parameter nPDCCH-StartSFoffset-UESS. Also, in the case of the Type2-NPDCCH common search space, G appearing in Eq. 1 is given by the higher layer parameter nPDCCH-startSF-Type2CSS, and $\alpha_{offset}$ is given by the higher layer parameter nPDCCH-startSFoffset-Type2CSS. Also, in the case of Type1-NPDCCH common search space, k is k0 and is determined based on the position of an NB-IoT paging opportunity subframe.

When a UE is configured with a PRB for monitoring the NPDCCH UE-specific search space by the higher layer, the UE has to monitor the NPDCCH UE-specific search space in the PRB configured by the higher layer. In this case, the UE is not expected to receive NPSS, NSSS, and NPBCH from the corresponding PRB. On the other hand, if the PRB is not configured by the higher layer, the UE has to monitor the NPDCCH UE-specific search space on the same PRB from which the NPSS/NSSS/NPBCH has been detected.

When an NB-IoT UE detects an NPDCCH with DCI format N0 which ends at subframe n, and transmission of the corresponding NPUSCH format 1 is started from subframe n+k, the UE is not required to monitor the NPDCCH in any subframe starting from subframe n+1 to subframe n+k−1.

Also, when an NB-IoT UE detects an NPDCCH with DCI format N1 or N2 which ends at subframe n; and transmission of the corresponding NPDSCH is started from subframe n+k, the UE is not required to monitor the NPDCCH in any subframe starting from subframe n+1 to subframe n+k−1.

Also, when an NB-IoT UE detects an NPDCCH with DCI format N1 which ends at subframe n, and transmission of the corresponding NPUSCH format 2 is started from subframe n+k, the UE is not required to monitor the NPDCCH in any subframe starting from subframe n+1 to subframe n+k−1.

Also, when an NB-IoT UE detects an NPDCCH with DCI format N1 for "PDCCH order", which ends at subframe n, and transmission of the corresponding NPRACH is started from subframe n+k, the UE is not required to monitor the NPDCCH in any subframe starting from subframe n+1 to subframe n+k−1.

Also, when an NB-IoT UE performs NPUSCH transmission which ends at subframe n, the UE is not required to monitor the NPDCCH in any subframe starting from subframe n+1 to subframe n+3.

Also, when an NB-IoT UE performs NPUSCH transmission which ends at subframe n, the UE is not required to monitor the NPDCCH in any subframe starting from subframe n+1 to subframe n+3.

With respect to the NPDCCH starting position, the starting OFDM symbol of the NPDCCH is given by the index $I_{NPDCCHStart}$ in the first slot of subframe k. At this time, the higher layer parameter operationModeInfo is '00' or '01', the index $I_{NPDCCHStart}$ is given by the higher layer parameter operationModeInfo. On the other hand, if the higher layer parameter operationModeInfo indicates '10' or '11', the index $I_{NPDCCHStart}$ is 0.

Downlink Control Information (DCI) Format

In association with MTC, DCI format 6-0A, DCI format 6-0B, DCI format 6-1A, DCI format 6-1B, and DCI format 6-2 may be considered as downlink control information (DCI) format for the Bandwidth reduced Low complexity (BL) operation.

First, the DCI format 6-0A is used for scheduling a PUSCH in an uplink cell and may transmit the following information.

Flag (for example, 1 bit) for distinguishing the format 6-0A and the format 6-1A from each other.
Frequency hopping flag (for example, 1 bit)
Resource block assignment (for example, $$\left\lceil \log_2 \left\lfloor \frac{N_{RB}^{UL}}{6} \right\rfloor \right\rceil + 5 \text{ bits}\right).$$

With respect to the bits for the resource block assignment, the $$\left\lceil \log_2 \left\lfloor \frac{N_{RB}^{UL}}{6} \right\rfloor \right\rceil$$

MSB bit provides a narrowband index, and the 5 bits provide resource allocation by using UL resource allocation type 0 within the indicated (i.e., provided) narrowband.

Modulation and Coding Scheme (for example, 4 bits)
Repetition number (for example, 2 bits)
HARQ process number (for example, 3 bits)
New data indicator (for example, 1 bit)
Redundancy version (for example, 2 bits)
Transmit Power Control (TPC) command for a scheduled PUSCH (for example, 2 bits)
UL index (for example, 2 bits)
Downlink Assignment Index (DAI) (for example, 2 bits)
Channel State Information (CSI) request (for example, 1 bit)
Sounding Reference Signal (SRS) request (for example, 1 bit)
DCI subframe repetition number (for example, 2 bits)

At this time, if the number of information bits of the format 6-0A mapped to a given search space is intended for scheduling the same serving cell and is smaller than the payload size (at this time, the payload size includes padding bits added to the format 6-1A) of the format 6-1A mapped to the same search space, '0's have to be appended until the payload size of the format 6-0A becomes the same as the payload size of the format 6-1A.

Next, the DCI format 6-0B is used for scheduling a PUSCH in an uplink cell and may transmit the following information.

Flag (for example, 1 bit) for distinguishing the format 6-0B and the format 6-1 B from each other.
Frequency hopping flag (for example, 1 bit)
Resource block assignment (for example, $$\left\lceil \log_2 \left\lfloor \frac{N_{RB}^{UL}}{6} \right\rfloor \right\rceil + 3 \text{ bits}\right).$$

With respect to the bits for the resource block assignment, the $$\left\lceil \log_2 \left\lfloor \frac{N_{RB}^{UL}}{6} \right\rfloor \right\rceil$$

MSB bit provides a narrowband index, and the 3 bits provide resource allocation within the indicated (i.e., provided) narrowband.

Modulation and Coding Scheme (for example, 4 bits)
Repetition number (for example, 3 bits)
HARQ process number (for example, 3 bits)
New data indicator (for example, 1 bit)
DCI subframe repetition number (for example, 2 bits)

At this time, if the number of information bits of the format 6-0B mapped to a given search space is intended for scheduling the same serving cell and is smaller than the payload size (at this time, the payload size includes padding bits added to the format 6-1 B) of the format 6-1 B mapped to the same search space, '0's have to be appended until the payload size of the format 6-0B becomes the same as the payload size of the format 6-1 B.

Next, the DCI format 6-1A is used for scheduling one PDSCH codeword in a cell and a random access procedure initiated by a PDCCH order. At this time, the DCI corresponding to the PDCCH order may be carried by an MPDCCH.

The DCI format 6-1A may transmit the following information.

Flag (for example, 1 bit) for distinguishing the format 6-0A and the format 6-1A from each other.

The format 6-1A is used in the random access procedure initiated by the PDCCH order only when the Cyclic Redundancy Check (CRC) of the format 6-1A is scrambled with the C-RNTI, and all the remaining fields are configured as follows.

$$\left\lceil \log_2 \left\lfloor \frac{N_{RB}^{UL}}{6} \right\rfloor \right\rceil + 5 \text{ bits},$$

Resource block assignment (for example, all of the bits are set to '1').
Preamble index (for example, 6 bits)
PRACH mask index (for example, 4 bits)
Starting CE level (for example, 2 bits)

The remaining bits of the format 6-1A for scheduling allocation of one PDSCH codeword are set to '0'.

Otherwise, the remaining information as shown below is transmitted.

Frequency hopping flag (for example, 1 bit)
Resource block assignment (for example, $$\left\lceil \log_2 \left\lfloor \frac{N_{RB}^{UL}}{6} \right\rfloor \right\rceil + 5 \text{ bits}).$$

With respect to the bits for the resource block assignment, the $$\left\lceil \log_2 \left\lfloor \frac{N_{RB}^{UL}}{6} \right\rfloor \right\rceil$$

MSB bit provides a narrowband index, and the 5 bits provide resource allocation by using DL resource allocation type 2 within the indicated (i.e., provided) narrowband.

Modulation and Coding Scheme (for example, 4 bits)
Repetition number (for example, 2 bits)
HARQ process number (for example, 3 bits)
New data indicator (for example, 1 bit)
Redundancy version (for example, 2 bits)
Transmit Power Control (TPC) command for a PUSCH (for example, 2 bits)
Downlink Assignment Index (DAI) (for example, 2 bits)
Antenna port and scrambling identity (for example, 2 bits)
Sounding reference signal (SRS) request (for example, 1 bit)
TPMI information for precoding
PMI confirmation for precoding (for example, 1 bit)
HARQ-ACK resource offset (for example, 2 bits)
DCI subframe repetition number (for example, 2 bits)

When the CRC of the format 6-1A is scrambled with the RA-RNTI, the following information (i.e., field), among the information (i.e., fields), is reserved.

HARQ process number
New data indicator
Downlink assignment index (DAI)
HARQ-ACK resource offset At this time, if a UE is not configured to decode an MPDCCH having a CRC scrambled by the C-RNTI, and the number of information bits of the format 6-1A is smaller than the number of information bits of the format 6-0A, '0's have to be appended until the payload size of the format 6-1A becomes the same as the payload size of the format 6-0A.

Also, if a UE is configured to decode an MPDCCH having a CRC scrambled by the C-RNTI, and the number of information bits of the format 6-1A mapped onto a given search space is intended for scheduling the same serving cell and is smaller than the payload size of the format 6-0A mapped to the same search space, '0's have to be appended until the payload size of the format 6-1A becomes the same as the payload size of the format 6-0A.

Next, the DCI format 6-1 B is used for scheduling one PDSCH codeword and may transmit the following information.

Flag (for example, 1 bit) for distinguishing the format 6-0B and the format 6-1B from each other.

The format 6-1 B is used for a random access procedure initiated by a PDCCH order only when a CRC is scrambled with the C-RNTI, and all of the remaining fields are configured as follows.

Reserved bit (for example, $$\left\lceil \log_2 \left\lfloor \frac{N_{RB}^{UL}}{6} \right\rfloor \right\rceil + 2 \text{ bits},$$

all of the bits are set to '1').

Preamble index (for example, 6 bits)
PRACH mask index (for example, 4 bits)
Starting CE level (for example, 2 bits)

The remaining bits of the format 6-1A for scheduling allocation of one PDSCH codeword are set to '0'.

Otherwise, the remaining information as shown below is transmitted.

Modulation and Coding Scheme (for example, 4 bits)
Resource block assignment (for example, $$\left\lceil \log_2 \left\lfloor \frac{N_{RB}^{UL}}{6} \right\rfloor \right\rceil + 1 \text{ bits}$$

for a PDSCH). With respect to the bits for the resource block assignment, the $$\left\lceil \log_2 \left\lfloor \frac{N_{RB}^{UL}}{6} \right\rfloor \right\rceil$$

MSB bit provides a narrowband index, and the 1 bit provides resource allocation within the indicated (i.e., provided) narrowband.

Repetition number (for example, 2 bits)
HARQ process number (for example, 3 bits)
New data indicator (for example, 1 bit)
HARQ-ACK resource offset (for example, 2 bits)
DCI subframe repetition number (for example, 2 bits)

When the CRC of the format 6-1B is scrambled with the RA-RNTI, the following information (i.e., field), among the information (i.e., fields), is reserved.

HARQ process number
New data indicator
HARQ-ACK resource offset

At this time, if a UE is not configured to decode an MPDCCH having a CRC scrambled by the C-RNTI, and the number of information bits of the format 6-1 B is smaller than the number of information bits of the format 6-0B, '0's have to be appended until the payload size of the format 6-1B becomes the same as the payload size of the format 6-0B.

Also, if a UE is configured to decode an MPDCCH having a CRC scrambled by the C-RNTI, and the number of information bits of the format 6-1 B mapped onto a given search space is intended for scheduling the same serving cell and is smaller than the payload size of the format 6-0B mapped to the same search space, '0's have to be appended until the payload size of the format 6-1 B becomes the same as the payload size of the format 6-0B.

Next, the DCI format 6-2 is used for paging and direct indication; and may transmit the following information.

Flag (for example, 1 bit) for distinguishing paging and direction indication from each other When a value of the flag is 0, the DCI format 6-2 includes (or transmits) direct indication information (for example, 8 bits) and reserved information bits for configuring the size to be the same as the format 6-2 where the flag value is 1.

On the other hand, when the flag value is 1, the DCI format 6-2 includes (or transmits) resource block assignment (for example, $$\left(\left\lceil \log_2\left\lfloor \frac{N_{RB}^{UL}}{6} \right\rfloor \right\rceil \text{ bits}\right),$$

modulation and coding scheme (for example, 3 bits), repetition number (for example, 3 bits), and DCI subframe repetition number (for example, 2 bits).

Differently from the description above, as a DCI format related to NB-IoT, a DCI format N0, DCI format N1, and DCI format N2 may be considered.

First, the DCI format N0 is used for scheduling an NPUSCH in one uplink (UL) cell and may transmit the following information.

Flag (for example, 1 bit) for distinguishing the format N0 and the format N1 from each other, wherein the value of 0 may indicate the format N0, and the value of 1 the format N1.
Subcarrier indication (for example, 6 bits)
Resource assignment (for example, 3 bits)
Scheduling delay (for example, 2 bits)
Modulation and coding scheme (for example, 4 bits)
Redundancy version (for example, 1 bit)
Repetition number (for example, 3 bits)
New data indicator (for example, 1 bit)
DCI subframe repetition number (for example, 2 bits)

Next, the DCI format N1 is used for scheduling one NPDSCH codeword in one cell and a random access procedure initiated by NPDCCH order. At this time, the DCI corresponding to the NPDCCH order may be carried by an NPDCCH.

The DCI format N1 may transmit the following information.

Flag (for example, 1 bit) for distinguishing the format N0 and the format N1 from each other, wherein the value of 0 may indicate the format N0, and the value of 1 the format N1.

The format N1 is used for a random access procedure initiated by NPDCCH order only when an NPDCCH order indicator is set to '1', Cyclic Redundancy Check (CRC) of the format N1 is scrambled with the C-RNTI, and all of the remaining fields are configured as follows.

Starting number of NPRACH repetitions (for example, 2 bits)
Subcarrier indication of NPRACH (for example, 6 bits)
All of the remaining bits of the format N1 are set to '1'.
Otherwise, the remaining information as shown below is transmitted.
Scheduling delay (for example, 3 bits)
Resource assignment (for example, 3 bits)
Modulation and coding scheme (for example, 4 bits)
Repetition number (for example, 4 bits)
New data indicator (for example, 1 bit)
HARQ-ACK resource (for example, 4 bits)
DCI subframe repetition number (for example, 2 bits)

When the CRC of the format N1 is scrambled with the RA-RNTI, the following information (i.e., field), among the information (i.e., fields), is reserved.
New data indicator
HARQ-ACK resource offset At this time, if the number of information bits of the format N1 is smaller than the number of information bits of the format N0, '0's have to be appended until the payload size of the format n1 becomes the same as the payload size of the format N0.

Next, the DCI format N2 is used for paging and direct indication; and may transmit the following information.

Flag (for example, 1 bit) for distinguishing paging and direct indication, where the value of 0 may represent direct indication, and the value of 1 may represent paging.

When a value of the flag is 0, the DCI format N2 includes (or transmits) direct indication information (for example, 8 bits) and reserved information bits for configuring the size to be the same as the format N2 where the flag value is 1.

Meanwhile, if a value of the flag is 1, the DCI format N2 includes (or transmits) resource allocation (for example, 3 bits), modulation and coding scheme (for example, 4 bits), repetition number (for example, 4 bits), and DCI subframe repetition number (for example, 3 bits).

As described above, Narrowband (NB)-LTE refers to a system for supporting low complexity and low power consumption, having system bandwidth (BW) corresponding to one physical resource block (PRB) of the LTE system.

In other words, an NB-LTE system may be used as a communication method for implementing IoT by supporting mainly such devices (or UEs) as ones based on machine-type communication (MTC) in the cellular system. In other words, an NB-LTE system may also be called NB-IoT.

Also, the NB-LTE system is not required to allocate an additional band by using the same OFDM parameters used in the existing LTE system such as subcarrier spacing of the legacy LTE system. In this case, by allocating one PRB of the legacy LTE system band to be used for NB-LTE, frequency resources may be utilized in an efficient manner.

In the case of downlink, a physical channel of the NB-LTE system may be defined as N-Primary Synchronization Signal (N-PSS)/N-Secondary Synchronization Signal (N-SSS), N-Physical Broadcast Channel (N-PBCH), N-PDCCH/N-EPDCCH, or N-PDSCH. Here, the prefix 'N-' may be added to distinguish the physical channel of the NB-LTE system from that of the legacy LTE system.

In view of multicast or broadcast transmission distinguished from unicast transmission, the (legacy) LTE system has adopted the MBSFN subframe for supporting MBMS services and/or Single Cell Point-to-Multipoint (SC-PtM) scheme. Here, the SC-PtM scheme supports multicast-based downlink transmission, which may be used for update of firmware and/or software, group-wise message transmission, and so on. At this time, not only for a general LTE system but also for the NB-LTE (i.e. NB-IoT) system, a situation may occur where a broadcast or multicast service (for example, the SC-PtM) has to be provided, and it is necessary to consider a method which allows an MBMS service to be used.

Accordingly, the present invention proposes a method for performing (or applying) the SC-PtM scheme in the NB-LTE (i.e., NB-IoT) system. More specifically, the present specification proposes an N-PDCCH which transmits information related to SC-PtM and/or a position of a PRB to which an N-PDSCH is transmitted and a method for allocating the corresponding PRB. Here, the information related to SC-PtM may include SC-Multicast Control Channel (SC-MCCH), SC-Multicast Traffic Channel (SC-MTCH), and so on. The SC-MCCH may include control information related to the SC-MTCH (for example, RRC signaling message), and the SC-MTCH may include multicast or broadcast information (for example, broadcast traffic).

In the case of NB-LTE (i.e. NB-IoT), by taking into account the fact that an eNB and/or UE transmits and receives data and/or control information by receiving one PRB unit (i.e. by using a frequency region occupying a particular band), an available region in the frequency domain may be limited compared with the general LTE system. Moreover, in the case of NB-LTE, due to the characteristic that an eNB and/or UE repeatedly transmits data and/or control information, an available region in the time domain may also be limited compared with the general LTE system.

Figure 11:
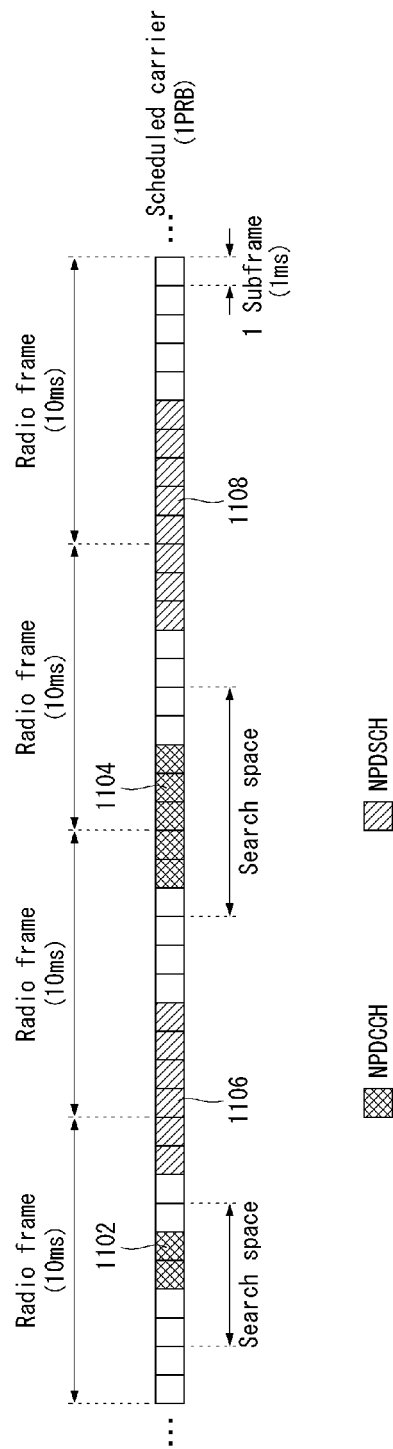
FIG. 11 illustrates one example of a method for transmitting an N-PDCCH and an N-PDSCH in an NB-LTE system to which a method proposed by the present specification may be applied.

FIG. 11 illustrates one example of a method for transmitting an N-PDCCH and an N-PDSCH in an NB-LTE system to which a method proposed by the present specification may be applied. FIG. 11 is used only for the convenience of descriptions and is not intended to limit the technical scope of the present invention.

Referring to FIG. 11, an N-PDCCH and the corresponding N-PDSCH are transmitted through a scheduled carrier (i.e. 1 PRB), and it is assumed that the N-PDCCH and N-PDSCH are transmitted in subframe units. In the NB-LTE system, each UE recognizes a single PRB as an individual carrier. Accordingly, a PRB in the present specification may be referred to as a concept similar to or the same as a carrier.

Also, as shown in FIG. 11, a UE needs to monitor a search space (for example, the 5 subframes and 8 subframes) configured for each N-PDCCH to receive the N-PDCCH. Here, monitoring a search space may be regarded as a process for decoding an N-PDCCH as much as a specific region according to the DCI format desired to be received through the corresponding search space and scrambling the corresponding CRC with a predefined specific RNTI value to check whether the scrambled CRC matches (i.e. corresponds to) a desired value.

In the case of the NB-LTE system, as shown in FIG. 11, an N-PDCCH and/or N-PDSCH may be transmitted repeatedly. For example, if it is assumed that an N-PDCCH is transmitted in 1 subframe unit, the N-PDCCH may be transmitted twice (N-PDCCH 1102) or five times (N-PDCCH 1104). Also, when it is assumed that the N-PDSCH is transmitted in 2 subframe units (i.e., a case where two subframes are configured as a default transmission unit by the resource allocation field included in the DCI), the N-PDSCH may be transmitted three times (N-PDSCH 1106) or four times (N-PDSCH 1108).

At this time, the repetition number of the N-PDCCH and/or the repetition number of the N-PDSCH may be specified by the DCI transmitted through the N-PDCCH.

As described above, compared with the general LTE system, an NB-LTE system has limited access to time and frequency resources for transmitting and receiving a signal and/or channel. Therefore, if the SC-PtM scheme is adopted additionally to the NB-LTE system, various problems may occur.

For example, in the case of the NB-LTE system, due to the characteristic described above, transmitted and received signals and/or channels may frequently overlap with each other. Therefore, when the SC-PtM scheme is introduced to an NB-LTE system, it may be highly likely that a signal and/or channel used in the SC-PtM scheme overlaps with a signal and/or channel (for example, random access channel (RACH) and paging channel) used in the existing NB-LTE system.

Similarly, as another example, according as a frequency region to which a control channel is transmitted is limited, and channels of the same content have to be transmitted repeatedly, the amount of control information which may be carried by a specific control channel region of an NB-LTE system may be limited. In this case, there are chances that specific control information may not be carried by the control channel region. Therefore, for an NB-LTE system, it is also necessary to consider a method for carrying control information for a specific signal and/or channel (for example, N-PDCCH/N-PDSCH for an SC-MTCH) through a data channel rather than the control channel.

Also, considering the fact that the control information used in SC-PtM may be requested differently from the methods used in the legacy NB-LTE, a DCI format considered in SC-PtM may differ from a DCI format used in the legacy NB-LTE. In this case, the length (i.e. payload size or the number of information bits) of the DCI format for SC-PtM may be different from the length of a DCI format (for example, DCI format for a random access use or DCI format for paging use) used in the legacy NB-LTE. At this time, a UE may need to perform an additional blind decoding operation according as the DCI format is varied. Therefore, to prevent a UE from performing an unnecessary blind decoding operation, it may be necessary to consider a method for configuring a search space for an N-PDCCH which carries DCI of SC-PtM use separately through an identifier (for example, Single Cell (SC)-RNTI or Group-RNTI (G-RNTI)) of SC-PtM use.

As described above, when SC-PtM is introduced to the NB-LTE in view of multicast or broadcast transmission, various problems may occur. Therefore, in what follows, described in detail will be a method for preventing the problems above and performing multicast PRB transmission which transmits and receives an N-PDCCH and N-PDSCH related to SC-PtM.

For the convenience of descriptions, in what follows, an anchor-type PRB (or anchor-type carrier) may indicate a PRB that transmits, for initial access in view of an eNB, an N-PSS, N-SSS, N-PBCH, and N-PDSCH for N-SIB. In this case, there may be one anchor-type PRB or a plurality of anchor-type PRBs. Also, in the present specification, as described above, when there exists one or a plurality of anchor-type PRBs, a specific anchor-type PRB selected by a UE through initial access may be referred to (or defined) as an anchor PRB (or anchor carrier). In addition, in the present specification, a PRB allocated by an eNB to perform a downlink process (or procedure) after initial access may be referred to (or defined) as an additional PRB (or additional carrier).

Also, the DCI format N0, DCI format N1, and DCI format N2 mentioned in the present specification may refer to the DCI format N0, DCI format N1, and DCI format N2 described above (defined by the 3GPP specification, for example).

Also, embodiments described below are distinguished from each other only for the convenience of descriptions; part of a structure or characteristics of a particular embodiment may be included in another embodiment or may be replaced with a structure or characteristics corresponding to yet another embodiment. For example, a method described in a second embodiment below may be applied additionally to a method described in a first embodiment and vice versa.

First Embodiment—Multicast Transmission Method Using a PRB Different from a PRB Configured for Transmission of Legacy NB-IoT First, described will be a method performed by a UE for performing multicast transmission by using a PRB different from a PRB (i.e., a camp-on PRB, unicast PRB, paging PRB, or random access PRB) configured for transmission of the legacy NB-IoT. In other words, the method may be a method for performing multicast transmission by using a PRB different from a PRB allocated for procedures used in the legacy NB-IoT. This may be understood that a UE performs multicast transmission based on the SC-PtM scheme through a PRB different from a camped-on PRB, PRB allocated for unicast transmission, PRB allocated for a paging procedure, or PRB allocated for a random access procedure. Here, the multicast transmission based on the SC-PtM scheme may include transmission of an SC-MCCH-related N-PDCCH and/or N-PDSCH; and transmission of an SC-MTCH-related N-PDCCH and/or N-PDSCH.

First of all, when the multicast PRB transmission is performed in the different PRB, a method for configuring an N-PDCCH transmitting control information of an MCCH (i.e., SC-MCCH) and an N-PDCCH transmitting control information of an MTCH (i.e., SC-MTCH) to be transmitted from the same PRB (method 1); or from PRBs different from each other (method 2) may be considered. In other words, an SC-MCCH-related N-PDCCH and an SC-MTCH-related N-PDCCH may be transmitted from the same PRB or separately from PRBs different from each other.

Method 1: Method for Configuring an N-PDCCH Transmitting Control Information of an MCCH and an N-PDCCH Transmitting Control Information of an MTCH to be Transmitted from the Same PRB First, described will be a method for transmitting an N-PDCCH for an MCCH (i.e. SC-MCCH) and an N-PDCCH for an MTCH (i.e. SC-MTCH) at the same PRB.

Figure 12:
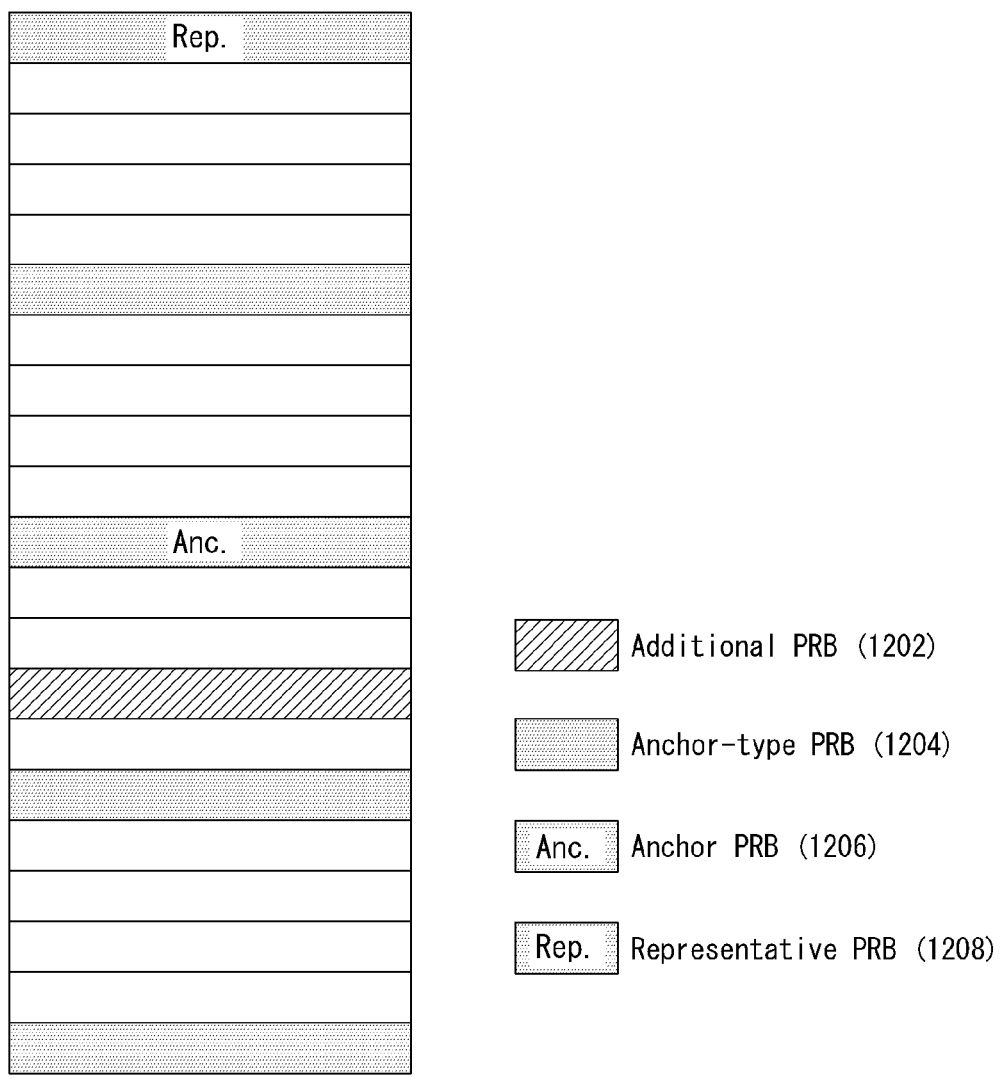
FIG. 12 illustrates one example of a method for configuring a PRB in an NB-LTE (i.e. NB-IoT) system to which a method proposed by the present invention may be applied.

FIG. 12 illustrates one example of a method for configuring a PRB in an NB-LTE (i.e. NB-IoT) system to which a method proposed by the present invention may be applied. FIG. 12 is used only for the convenience of descriptions and is not intended to limit the technical scope of the present invention.

Referring to FIG. 12, an additional PRB 1202, anchor-type PRB 1204, anchor PRB 1206, and representative PRB 1208 may be configured as a PRB for the SC-PtM scheme in the NB-LTE (i.e. NB-IoT) system.

In the case of method 1, it may be configured so that an N-PDCCH for an MCCH (i.e. SC-MCCH) and an N-PDCCH for an MTCH (i.e. SC-MTCH) are transmitted through the representative PRB.

An initial UE may be configured to receive information about a representative PRB index configured as a representative through an anchor PRB (i.e. an initially accessed anchor-type PRB) by using a system information block (SIB) (for example, SIB 20 for NB-IoT use). Here, the representative PRB index may refer to an index indicating a specific PRB configured to receive an SC-PtM-related signal and/or channel. In other words, the SIB may include (or may be used to carry) information related to SC-PtM (for example, a period at which SC-PtM is transmitted (i.e. SC-PtM transmission period)) and additionally include information about the representative PRB index.

The UE which has received the system information (SI) may know (or identify or determine) the representative PRB index by which SC-PtM is transmitted and know the period at which SC-PtM is transmitted. Here, transmission of SC-PtM may indicate transmission of an N-PDCCH/N-PDSCH related to an SC-MCCH for the SC-PtM scheme and/or transmission of the N-PDCCH/N-PDSCH related to an SC-MTCH.

Since the UE may know the representative PRB index and/or SC-PtM transmission period, the UE may monitor a predefined (or preconfigured or predetermined) common search space (CSS) (for example, Type1A-NPDCCH CSS) at the representative PRB. Through the monitoring, the UE may acquire SC-MCCH related scheduling information (i.e. N-PDSCH scheduling). In other words, the UE may acquire N-PDSCH scheduling information about an SC-MCCH through the monitoring.

At this time, the UE may be configured to monitor the CSS region by using an SC-RNTI value or another predefined (or preconfigured) RNTI value. Also, a DCI format used in this case may be configured to the DCI format N1 or DCI format N2 used in the legacy NB-IoT (i.e. NB-LTE) or to a new DCI format (i.e. DCI format Nm where m is an integer). Therefore (or accordingly) (i.e. by using the acquired N-PDSCH scheduling information), if the UE acquires SC-MCCH information by decoding the corresponding N-PDSCH, the UE may acquire a G-RNTI value for each Temporary Mobile Group Identifier (TMGI). In other words, the UE may acquire SC-MCCH information from the N-PDSCH corresponding to the scheduling information acquired through the monitoring and acquire the G-RNTI value from the acquired SC-MCCH information.

Next (or afterwards), the UE may monitor the predefined (or preconfigured) CSS (for example, Type2A-NPDCCH CSS) at the representative PRB. Through the monitoring, the UE may acquire SC-MTCH related scheduling information (i.e. N-PDSCH scheduling). In other words, the UE, through the monitoring, may acquire N-PDSCH scheduling information about the SC-MTCH.

At this time, the UE may be configured to monitor the CSS region by using a G-RNTI value corresponding to a TMGI that the UE wants to receive or another predefined (or preconfigured) RNTI value. Also, a DCI format used in this case may be configured to the DCI format N1 or DCI format N2 used in the legacy NB-IoT (i.e. NB-LTE) or to a new DCI format (i.e. DCI format Nm where m is an integer). Therefore (or accordingly) (i.e. by using the acquired N-PDSCH scheduling information), if the UE acquires SC-MTCH information by decoding the corresponding N-PDSCH, the UE may acquire MBMS data (for example, software update). In other words, the UE may acquire multicast or broadcast data by acquiring SC-MTCH information from an N-PDSCH corresponding to the scheduling information acquired through the monitoring.

Method 2: Method for Configuring an N-PDCCH Transmitting Control Information of an MCCH and an N-PDCCH Transmitting Control Information of an MTCH to be Transmitted from Different PRBs In view of utilization of a resource block, it may be efficient to transmit an MCCH (i.e. SC-MCCH) from a single PRB. This is so because if the MCCH is configured to be transmitted by a plurality of PRBs, the same information has to be carried for a plurality of PRBs. On the other hand, taking into account the fact that an MTCH (i.e. SC-MTCH) carries different information for each TMGI, transmitting an MTCH from a single PRB may cause system overload. Therefore, it may be necessary for an NB-LTE (i.e.

NB-IoT) system to consider a method for transmitting the MTCH by using different PRBs according to the Temporary Mobile Group Identifier (TMGI) (or G-RNTI).

Accordingly, differently from the method above, a method for transmitting an N-PDCCH for an MCCH (i.e. SC-MCCH) and an N-PDCCH for an MTCH (i.e. SC-MTCH) from different PRBs will be described below.

FIG. 13 illustrates another example of a method for configuring a PRB in an NB-LTE (i.e. NB-IoT) system to which a method proposed by the present invention may be applied. FIG. 13 is used only for the convenience of descriptions and is not intended to limit the technical scope of the present invention.

Referring to FIG. 13, a Multicast-PRB (M-PRB) 1302, additional PRB 1304, anchor-type PRB 1306, anchor PRB 1308, and representative PRB 1310 may be configured as a PRB for the SC-PtM scheme in the NB-LTE (i.e. NB-IoT) system.

In the case of method 2, it may be configured so that an N-PDCCH for an MCCH (i.e. SC-MCCH) is transmitted through the representative PRB and an N-PDCCH for an MTCH (i.e. SC-MTCH) is transmitted through the M-PRB (or Multicast-carrier).

An initial UE may be configured to receive information about a representative PRB index configured as a representative through an anchor PRB by using an SIB (for example, SIB 20 for NB-IoT use). Here, the representative PRB index may refer to an index indicating a specific PRB configured to receive an SC-PtM-related signal and/or channel. In other words, the SIB may include information (for example, a period at which SC-PtM is transmitted) related to SC-PtM (or is used to carry the information) and additionally include (or carry) information about the representative PRB index.

The UE which has received the system information (SI) may know (or identify or determine) the representative PRB index by which SC-PtM is transmitted and know the period at which SC-PtM is transmitted. Here, transmission of SC-PtM may indicate transmission of an N-PDCCH/N-PDSCH related to an SC-MCCH for the SC-PtM scheme and/or transmission of the N-PDCCH/N-PDSCH related to an SC-MTCH.

Since the UE may know the representative PRB index and/or SC-PtM transmission period, the UE may monitor a predefined (or preconfigured or predetermined) common search space (CSS) (for example, Type1A-NPDCCH CSS) at the representative PRB. Through the monitoring, the UE may acquire SC-MCCH related scheduling information (i.e. N-PDSCH scheduling). In other words, the UE may acquire N-PDSCH scheduling information about an SC-MCCH through the monitoring.

At this time, the UE may be configured to monitor the CSS region by using an SC-RNTI value or another predefined (or preconfigured) RNTI value. Here, the SC-RNTI value is used for dynamically scheduled SC-PtM control information and is related to the SC-MCCH.

Also, the DCI format used in this case may be configured to the DCI format N1 or DCI format N2 used in the legacy NB-IoT (i.e. NB-LTE) or to a new DCI format (i.e. DCI format Nm where m is an integer). Therefore, if the UE acquires SC-MCCH information by decoding the corresponding N-PDSCH, the UE may acquire a G-RNTI value for each Temporary Mobile Group Identifier (TMGI). In other words, the UE may acquire SC-MCCH information from the N-PDSCH corresponding to the scheduling information acquired through the monitoring and acquire the G-RNTI value from the acquired SC-MCCH information.

Here, the G-RNTI value is used for dynamically scheduled SC-PtM transmission and is related to the SC-MTCH.

Also, the UE may be configured to acquire different M-PRB index information according to a G-RNTI (or specific G-RNTI group) by decoding an N-PDSCH through which an SC-MCCH is transmitted or configured to receive different M-PRB index information according to the G-RNTI (or specific G-RNTI group) through group-specific RRC signaling. In other words, by decoding an N-PDSCH through which an SC-MCCH is transmitted, the UE may acquire information about an M-PRB index (i.e. a PRB index by which an SC-MTCH is transmitted) configured differently for each G-RNTI. At this time, information about the M-PRB index may be carried through RRC signaling.

In other words, the UE may receive an SC-MCCH, which is a logical channel, through an N-PDSCH, which is a physical channel, and acquire information (for example, index) about a PRB (i.e. a downlink carrier) used for an SC-MTCH included in the received SC-MCCH (i.e. carried by the received SC-MCCH). Here, information about a PRB used for the SC-MTCH may be carried through higher layer signaling (for example, RRC signaling). At this time, information about the PRB and/or the higher layer signaling may be configured for each G-RNTI.

In this case, configuration information (i.e. control information) for an N-PDCCH/N-PDSCH related to the SC-MTCH is carried through the SC-MCCH (i.e. N-PDSCH related to the SC-MCCH). In other words, as specific control information is carried through a data channel region rather than a control channel region, the control information may be carried in an efficient manner for the NB-IoT system limited in terms of time and frequency resources.

Next (or afterwards), the UE may monitor a CSS (for example, Type2A-NPDCCH CSS) predefined (or preconfigured) at a PRB corresponding to a G-RNTI (or specific G-RNTI group) included in a TMGI that the UE wants to receive (or corresponding to a TMGI that the UE wants to receive), User (UE)-specific Search Space (USS), or Group-specific Search Space (GSS) (or at least one thereof). Through the monitoring, the UE may acquire scheduling information (i.e. N-PDSCH scheduling) related to an SC-MCCH. In other words, through the monitoring, the UE may acquire N-PDSCH scheduling information for an SC-MTCH.

At this time, the UE may be configured to monitor the CSS, USS, or GSS (or at least one thereof) by using a G-RNTI value corresponding to a TMGI that the UE wants to receive or another predefined (or preconfigured) RNTI value. Also, a DCI format used in this case may be configured by a DCI format N1 or DCI format N2 used in the legacy NB-IoT (i.e. NB-LTE) or by a new DCI format (i.e. DCI format Nm where m is an integer). Therefore, if the UE acquires SC-MTCH information by decoding the corresponding N-PDSCH, the UE may acquire MBMS data. In other words, the UE may acquire multicast or broadcast data by acquiring SC-MTCH information from an N-PDSCH corresponding to the scheduling information acquired through the monitoring.

For both of the method 1 and the method 2, in most cases, an N-PDSCH transmitting an MCCH (i.e. SC-MCCH) is configured to be transmitted to the same PRB to which an N-PDCCH transmitting control information of the MCCH is transmitted, and also, an N-PDSCH transmitting an MTCH (i.e. SC-MTCH) is configured to be transmitted to the same PRB to which an N-PDCCH transmitting control information of the MTCH is transmitted. However, considering the characteristics of an NB-IoT system which uses one resource block, a PRB transmitting an N-PDCCH doesn't necessarily have to be configured to be the same unconditionally as a PRB transmitting a (corresponding) N-PDSCH. Therefore, it may be configured so that information indicating transmission of an N-PDSCH through the third PRB different from PRBs through which individual N-PDCCHs are transmitted may be carried dynamically.

For example, an N-PDCCH transmitting control information of an MCCH (i.e. SC-MCCH) may be configured to inform of a new (i.e., different) PRB index by which an N-PDSCH additionally transmitting the MCCH is transmitted. In other words, information indicating a PRB to which the N-PDSCH is transmitted may be included in the N-PDSCH. Similarly, an N-PDCCH transmitting control information of an MTCH (i.e. SC-MTCH) may be configured to inform of a new PRB index by which an N-PDSCH additionally transmitting the MTCH is transmitted.

At this time, a new PRB to which an N-PDSCH transmitting (or carrying) an SC-MCCH is transmitted, a new PRB to which an N-PDCCH transmitting (or carrying) SC-MTCH scheduling information is transmitted, and/or a new PRB to which an N-PDSCH transmitting (or carrying) an SC-MTCH is transmitted may be configured in various ways. As one example, the three new PRBs may be allocated independently from each other, may be the same with each other, may be separated from each other by a predetermined spacing of PRBs, or may have a relationship based on a specific rule among them.

Also, for both of the method 1 and the method 2, a UE may acquire SC-MCCH change notification information by monitoring a predefined (or preconfigured) common search space (CSS) at the representative PRB. Here, the SC-MCCH change notification information may include an indicator notifying that the SC-MCCH has been changed or information in the form of a flag. At this time, the UE may be configured to monitor the CSS region by using an SC-RNTI value or another predefined (or preconfigured) RNTI value. Also, the DCI format used in this case may be configured to the DCI format N1 or DCI format N2 used in the legacy NB-IoT (i.e. NB-LTE) or to a new DCI format (i.e. DCI format Nm where m is an integer).

Also, in the method 1 and the method 2, a method for notifying of a PRB to which an MCCH (i.e. N-PDSCH to which an SC-MCCH is transmitted) and/or an N-PDCCH scheduling an MCCH (i.e. SC-MTCH) is transmitted and a PRB to which an MTCH (i.e. N-PDSCH to which an SC-MTCH is transmitted) and/or an N-PDCCH scheduling an MTCH (i.e. SC-MTCH) is transmitted separately through system information (for example, SIB) may be taken into account. In other words, in the method above, PRB information (i.e. index) related to an SC-MCCH and PRB information related to an SC-MTCH may be carried through an SIB. Similarly, in the method 1, a representative PRB may be configured to be applied to an MTCH and/or an N-PDCCH scheduling an MTCH rather than an MCCH and/or an N-PDCCH scheduling an MCCH. At this time, the UE may be configured to read (or decode) the MCCH and/or an N-PDCCH scheduling the MCCH from an anchor PRB.

Also, the representative PRB mentioned in the method 1 and the method 2 may be a representative anchor-type PRB selected among anchor-type PRBs.

Second Embodiment—Multicast Transmission Method Using the Same PRB Configured for Transmission of Legacy NB-IoT As described above, a method for receiving an N-PDCCH (and/or N-PDSCH) for an MCCH or an N-PDCCH (and/or N-PDSCH) for an MTCH by using a PRB different from the PRB (i.e., a camp-on PRB, unicast PRB, paging PRB, or random access PRB) configured for transmission of the legacy NB-IoT receives multicast transmission by using a PRB independent from legacy NB-IoT transmission in view of a UE.

Therefore, when viewed from the standpoint of a configured UE, there is no such a case where an N-PDCCH for unicast transmission is transmitted through the same PRB for an N-PDCCH for SC-PtM. Also, from the standpoint of an idle UE, there is no such a case where Paging DCI (i.e. an N-PDCCH for paging) is transmitted through the same PRB for an N-PDCCH for SC-PtM.

Differently from the above, when an N-PDCCH and/or N-PDSCH for SC-PtM is transmitted through the same PRB as a camp-on PRB (or unicast PRB, paging PRB, or random access PRB), the N-PDCCH and/or N-PDSCH may overlap a signal and/or channel in the legacy NB-IoT system such as the unicast N-PDCH or the paging DCI. Therefore, when SC-PtM based multicast transmission is performed through the same PRB as a camp-on PRB (or unicast PRB, paging PRB, random access PRB), a method for processing (or performing) the multicast transmission needs to be considered.

The following two methods may be considered as a method for receiving an N-PDCCH (and/or N-PDSCH) for an MCCH or an N-PDCCH (and/or N-PDSCH) for an MTCH (i.e. SC-MTCH) by using the same PRB as the camp-on PRB (or unicast PRB, paging PRB, random access PRB). Here, the two methods may be distinguished from each other according to which DCI format is used for setting a DCI format of an N-PDCCH carrying control information of the M-CCH (i.e. SC-MCCH) or MTCH (i.e. SC-MTCH). In other words, in this case, a method for setting a DCI format of an N-PDCCH carrying control information of the MCCH (i.e. SC-MCCH) or MTCH (i.e. SC-MTCH) to be the same as the DCI format N1 (method 1) and a method for setting a DCI format of the N-PDCCH to be the same as the DCI format N2 (method 2) may be considered. Also, each method may be further classified according to whether a UE is in the idle mode or connected mode. This is so because a DCI format may be selected according to the UE's mode. For example, while a UE uses the DCI format N2 for paging in the idle mode, the UE may use the DCI format N1 for an uplink/downlink grant in the connected mode.

Method 1: Method for Setting a DCI Format of an N-PDCCH Carrying Control Information of an MCCH or an MTCH to be the Same as the DCI Format N1

First, a method for setting a DCI format of an N-PDCCH related to SC-PtM to be the same as the DCI format N1 will be described. At this time, a method for setting the DCI format to be the same as the DCI format N1 may indicate a configuration method which actually uses the DCI format N1 or uses a new DCI format to have the same payload of the DCI format N1. At this time, when space (for example, the number of bits) is still available even if all of the data are put into a DCI format, a method for inserting additional '0's (i.e. a zero-padding method) may have to be used to configure the length of the DCI format to be the same as the length of the DCI format N1. At this time, when zero padding is performed to set the size of the DCI format N1 to be the same as that of a different DCI format, the length of the DCI format N1 may indicate the length after the corresponding zero padding is performed.

Also, a search space to which an N-PDCCH carrying control information of an MCCH or an MTCH is transmitted may be configured to use a common search space (CSS) for SC-PtM. In particular, in order not to increase the number of blind decoding of an N-PDCCH by a UE, setting the DCI format of an N-PDCCH carrying control information of an MCCH or an MTCH to be the same as the DCI format N1 may be applied to a case where the following two conditions are satisfied.

The first of the two conditions may be a case where a search space to which an N-PDCCH carrying control information of an MCCH or MTCH is transmitted is configured to be included in a UE-specific search space (USS) to which an N-PDCCH for UE-specific data scheduling is transmitted while the second may be a case where a PRB to which an N-PDCCH carrying control information of an MCCH or MTCH is transmitted is the same as a PRB to which an N-PDCCH for UE-specific data scheduling is transmitted (USS is transmitted).

In particular, when the aforementioned method is applied to Machine Type Communication (MTC), a method for configuring a search space differently for each Coverage Enhancement (CE) mode may be considered. For example, in the case of CE mode B, similarly to the case of NB-IoT described above, a search space to which an N-PDCCH carrying control information of an MCCH or MTCH is transmitted may be included in the USS or configured to be the same as the UESS. Differently from the aforementioned case, in the case of CE mode A, a search space to which an N-PDCCH carrying control information of an MCCH or MTCH is transmitted may be included in the Typ0-MPDCCH CSS or configured to be the same as the Type0-MPDCCH CSS.

In what follows, detailed descriptions of the method 1 will be given by distinguishing a UE in the connected mode (for example, RRC connected UE) from a UE in the idle mode.

First, in the case of a UE in the connected mode, the corresponding UE may consider a method for configuring a search space to which DCI of an MCCH and an MTCH is transmitted to be the same as USS (i.e. NPDCCH USS) or to be included in the corresponding USS. In this case, a UE in the connected mode, without involving additional separate blind decoding (BD), may distinguish unicast control DCI that the UE has been watching so far (in other words, which has been being monitored) and DCI of an MCCH or DCI of an MTCH from each other by using CRC masking with different RNTI values. In the present specification, distinguishing DCI by using CRC masking with different RNTI values may indicate distinguishing DCI through CRC masking employing a different RNTI value. As one example, the different RNTI values may be configured as C-RNTI for the case of unicast, SC-RNTI for the case of an MCCH, and G-RNTI for the case of an MTCH. Also, in this case, the corresponding UE, without frequency shift (or transition) and/or unicast interruption, may decode MCCH control (i.e. an N-PDCCH/DCI related to control information of an MCCH) or MTCH control (i.e., an N-PDCCH/DCI related to control information of an MTCH).

In particular, when the method above is applied to MTC, in the case of CE mode B, similarly to the case of NB-IoT described above, a method for configuring a search space to which DCI of an MCCH and an MTCH is transmitted to be the same as USS (i.e. MPDCCH USS) or to be included in the corresponding USS may be considered. However, in the case of CE mode A, an MTC UE may monitor its USS and Type0-MPDCCH CSS simultaneously. Therefore, differently from the case of NB-IoT described above, a search space to which an N-PDCCH carrying control information of an MCCH or an MTCH may be included in the Type0-MPDCCH CSS or configured to be the same as the corresponding Type0-MPDCCH CSS. In this case, a UE in the connected mode, without involving additional separate blind decoding (BD), may distinguish common control DCI that the UE has been watching so far (in other words, which has been being monitored) and DCI of an MCCH or DCI of an MTCH from each other by using CRC masking with different RNTI values. As one example, the different RNTI values may be configured as C-RNTI for the case of unicast, SC-RNTI for the case of an MCCH, and G-RNTI for the case of an MTCH. Also, in this case, the corresponding UE, without frequency shift (or transition) and/or unicast interruption, may decode MCCH control (i.e. an N-PDCCH/DCI related to control information of an MCCH) or MTCH control (i.e., an N-PDCCH/DCI related to control information of an MTCH).

Differently from the description above, since a DCI format related to SC-PtM is set (i.e. configured) to the DCI format N1, a UE in the idle mode may be required to perform an additional action compared with the legacy action (for example, a legacy NB-IoT action) to watch (i.e. monitor) control information of an MCCH or control information of an MTCH transmitted according to the DCI format N1. At this time, the additional action may be described as follows.

A UE in the idle mode may monitor the DCI format N2 (or size of the DCI format N2) by using Paging-RNTI (P-RNTI) to watch (i.e. detect) paging that the UE previously desired to watch during a Discontinuous Reception (DRX) cycle of the UE. At this time, when DCI related to SC-PtM (i.e. MCCH or MTCH control) is transmitted to the same subframe, since the DCI is configured to have the size of the DCI format N1 (i.e. since the DCI format N1 and the DCI format N2 have different sizes), getting SC-PtM related information has to be given up. However, when a UE is capable of performing additional blind decoding, the UE may acquire SC-PtM related information by monitoring the DCI format N1 (i.e., the DCI format for an MCCH or an MTCH) by using the SC-RNTI or G-RNTI.

When paging and multicast (i.e. a signal and/or channel related to SC-PtM) are transmitted to the same subframe (i.e. the same timing), the method for monitoring the DCI format N2 to see (i.e. detect) paging by using P-RNTI at a PRB to which paging is transmitted may also be applied to the method of the first embodiment described above (for example, the method 2 of the first embodiment) for transmitting paging and multicast at different PRBs. In other words, when paging and multicast are transmitted at the same timing from different PRBs, a UE may monitor the DCI format N2 by using Paging-RNTI (P-RNTI) to see (i.e. detect) paging that the UE previously desired to watch during a DRX cycle of the UE.

Also, as described above, an N-PDCCH and/or N-PDSCH related to SC-PtM may overlap an N-PDCCH and/or N-PDSCH transmitted from the legacy NB-IoT. At this time, it may be required to configure which of the two is received first (i.e. configuration for priority).

For example, when an N-PDSCH transmitting paging (i.e., related to paging) and an N-PDSCH transmitting SC-PtM are transmitted to the same subframe (i.e. at the same timing), it may be configured as receiving paging. In other words, a UE may be configured to receive an N-PDSCH transmitting paging for the case above. Here, the N-PDSCH transmitting SC-PtM may include an N-PDSCH for an SC-MCCH and/or an N-PDSCH for an SC-MTCH as described above (for example, first embodiment). In other words, SC-PtM may indicate an SC-MCCH or SC-MTCH. Also, the N-PDSCH for the SC-MCCH may indicate an N-PDSCH corresponding to an N-PDSCH received by monitoring a specific CSS by using an SC-RNTI value or other RNTI value as described above (for example, first embodiment).

Similar to the above, the N-PDSCH for the SC-MTCH may indicate an N-PDSCH corresponding to an N-PDSCH received by monitoring CSS, USS, or GSS by using a G-RNTI value or other RNTI value as described above (for example, first embodiment). In other words, the N-PDSCH carrying SC-PtM may indicate an N-PDSCH corresponding to an N-PDCCH (i.e. allocated or scheduled by the NPDCCH) having a DCI CRC scrambled with the SC-RNTI or G-RNTI value. Also, the N-PDSCH transmitting the paging may indicate an N-PDSCH corresponding to an N-PDCCH having a DCI CRC scrambled with a P-RNTI.

Also, when an N-PDSCH transmitting paging and an N-PDCCH transmitting SC-PtM scheduling information are transmitted to the same subframe (i.e., at the same timing), it may be configured as receiving paging. In other words, a UE may be configured to receive an N-PDSCH transmitting paging for the case above. Here, the N-PDDCH transmitting the SC-PtM scheduling information may include an N-PDSCH for an SC-MCCH and/or an N-PDDCH for an SC-MTCH as described above (for example, first embodiment). In other words, the SC-PtM scheduling information may indicate DCI for an SC-MCCH or DCI for an SC-MTCH. Also, the N-PDSCH for the SC-MCCH may be detected (or received or decoded) as a specific CSS is monitored by using an SC-RNTI value or other RNTI value as described above (for example, first embodiment).

Similarly, the N-PDSCH for the SC-MTCH may be detected (or received or decoded) as a specific CSS is monitored by using a G-RNTI value or other RNTI value as described above (for example, first embodiment). Therefore, at a timing (i.e. subframe) of receiving an N-PDSCH transmitting paging, UE is not required to monitor a specific CSS corresponding to an SC-RNTI value or G-RNTI related to SC-PtM.

Also, even when an N-PDDCH transmitting scheduling information of paging and an N-PDSCH transmitting SC-PtM are transmitted to the same subframe (i.e., at the same timing), it may be configured as receiving paging (i.e., an N-PDCCH transmitting scheduling information of paging). In other words, a UE may be configured to receive an N-PDCCH transmitting scheduling information of paging for the case above. Here, the N-PDSCH transmitting SC-PtM may include an N-PDSCH for an SC-MCCH and/or N-PDSCH for an SC-MTCH as described above. Also, the N-PDCCH transmitting scheduling information of paging may be detected (or received or decoded) by monitoring a specific search space (for example, Type1-NPDCCH CSS) by using a P-RNTI value as described above. Therefore, a UE may not have to receive the N-PDSCH transmitting SC-PtM in a specific search space (i.e. a subframe corresponding to the specific search space) configured for the N-PDCCH transmitting scheduling information of paging (i.e. the N-PDCCH configured by P-RNTI).

Also, even when an N-PDDCH transmitting scheduling information of paging and an N-PDCCH transmitting scheduling information of SC-PtM are transmitted to the same subframe (i.e., at the same timing), it (a UE) may be configured as receiving paging (i.e., an N-PDCCH transmitting scheduling information of paging). In other words, a UE may be configured to receive an N-PDCCH transmitting scheduling information of paging for the case above. In other words, the UE is not required to monitor a specific CSS corresponding to an SC-RNTI value or G-RNTI related to SC-PtM in a specific search space (i.e. a subframe corresponding to the specific search space) configured for the N-PDCCH transmitting scheduling information of paging (i.e. the N-PDCCH configured by P-RNTI).

In other words, when an N-PDSCH and/or N-PDCCH (or search space) related to SC-PtM overlaps an N-PDSCH and/or N-PDCCH (or search space) related to paging, a UE may be configured to first receive the N-PDSCH and/or N-PDCCH (or search space) related to paging.

The method described above may be applied even when a PRB transmitting paging is the same as a PRB transmitting SC-PtM and also be applied when a PRB transmitting paging is different from a PRB transmitting SC-PtM. In other words, the aforementioned method may be applied not only for the second embodiment but also for the first embodiment described above (a method for performing multicast transmission in a PRB different from a paging PRB).

Also, the method related to paging may be applied in the same manner even when random access (i.e. an N-PDCCH and/or N-PDSCH related to random access) collides with (or overlaps) multicast (i.e. an N-PDCCH and/or N-PDSCH related to SC-PtM).

For example, when an N-PDSCH related to a random access procedure and an N-PDSCH transmitting SC-PtM are transmitted to the same subframe (i.e. at the same timing), it may be configured as receiving random access. In other words, a UE may be configured to receive an N-PDSCH related to a random access procedure for the case above. Here, the N-PDSCH transmitting SC-PtM is the same as described above (i.e. what has been described in the paging-related embodiment). Also, the N-PDSCH related to the random access procedure may indicate an N-PDSCH corresponding to an N-PDCCH having a DCI CRC scrambled with a C-RNTI or a temporary C-RNTI.

Also, even when an N-PDSCH related to a random access procedure and an N-PDCCH transmitting SC-PtM scheduling information are transmitted to the same subframe (i.e. at the same timing), it may be configured as receiving random access. In other words, a UE may be configured to receive an N-PDSCH related to a random access procedure for the case above. Therefore, the UE is not required to monitor a specific CSS corresponding to an SC-RNTI value or G-RNTI related to SC-PtM at a timing (i.e. subframe) of receiving an N-PDSCH transmitting random access.

Also, even when an N-PDCCH transmitting scheduling information of random access (i.e. scheduling information of an N-PDSCH for random access) and an N-PDSCH transmitting SC-PtM are transmitted to the same subframe (i.e. at the same timing), it may be configured as receiving random access (i.e. an N-PDCCH transmitting scheduling information of random access). Therefore, the UE may not have to receive the N-PDSCH transmitting SC-PtM in a specific search space (i.e. a subframe corresponding to the specific search space) configured for the N-PDCCH transmitting scheduling information of random access (i.e. the N-PDCCH configured by a C-RNTI or a temporary C-RNTI).

Also, even when an N-PDCCH transmitting scheduling information of random access and an N-PDCCH transmitting scheduling information of SC-PtM are transmitted to the same subframe (i.e. at the same timing), it (a UE) may be configured as receiving random access (i.e. an N-PDCCH transmitting scheduling information of random access). In other words, the UE is not required to monitor a specific CSS corresponding to an SC-RNTI value or G-RNTI related to SC-PtM in a specific search space (i.e. a subframe corresponding to the specific search space) configured for the N-PDCCH transmitting scheduling information of random access.

In other words, when an N-PDSCH and/or N-PDCCH (or search space) related to SC-PtM overlaps an N-PDSCH and/or N-PDCCH (or search space) related to random access, a UE may be configured to first receive the N-PDSCH and/or N-PDCCH (or search space) related to random access.

Also, when random access and multicast are transmitted to the same subframe (i.e. at the same timing), the corresponding UE may be configured as having a relationship such that a search space to which DCI of an MCCH (i.e. SC-MCCH) or DCI of an MTCH (i.e. SC-MTCH) is transmitted is the same as the CSS used for random access (i.e. Type2-NPDCCH CSS) or included in the corresponding CSS. In this case, the corresponding UE, without involving additional separate blind decoding (BD), may distinguish random access DCI that the UE has been watching so far (in other words, which has been being monitored) and DCI of an MCCH or DCI of an MTCH from each other by using CRC masking with different RNTI values. As one example, the different RNTI values may be configured as C-RNTI for the case of random access, SC-RNTI for the case of an MCCH, and G-RNTI for the case of an MTCH.

Method 2: Method for Setting a DCI Format of an N-PDCCH Carrying Control Information of an MCCH or an MTCH to be the Same as the DCI Format N2

Different from the method 1 described above, a method for setting a DCI format of an N-PDCCH related to SC-PtM to be the same as the DCI format N2 will be described.

At this time, a method for setting the DCI format to be the same as the DCI format N2 may indicate a configuration method which actually uses the DCI format N2 or uses a new DCI format to have a payload such as the DCI format N2. At this time, when space (for example, the number of bits) is still available even if all of the data are put into a DCI format, a method for inserting additional '0's (i.e. a zero-padding method) may have to be used to configure the length of the DCI format to be the same as the length of the DCI format N2. At this time, when zero padding is performed to set the size of the DCI format N2 to be the same as that of a different DCI format, the length of the DCI format N2 may indicate the length after the corresponding zero padding has been performed.

Also, a search space to which an N-PDCCH carrying control information of an MCCH or an MTCH is transmitted may be configured to use a common search space (CSS) for SC-PtM. In particular, in order not to increase the number of blind decoding of an N-PDCCH by a UE, setting the DCI format of an N-PDCCH carrying control information of an MCCH or an MTCH to be the same as the DCI format N2 may be applied to a case where the following two conditions are satisfied.

The first of the two conditions may be a case where a search space to which an N-PDCCH carrying control information of an MCCH or MTCH is transmitted is configured to be included in a common search space (CSS) (i.e., Type1-NPDCCH CSS) to which an N-PDCCH for paging scheduling is transmitted while the second may be a case where a PRB to which an N-PDCCH carrying control information (i.e. DCI) of an MCCH or MTCH is transmitted is the same as a PRB (to which a cell-specific search space is transmitted) to which an N-PDCCH scheduling paging is transmitted.

In what follows, detailed descriptions of the method 2 will be given by distinguishing a UE in the idle mode from a UE in the connected mode.

First, in the case of a UE in the idle mode, the corresponding UE may consider a method for configuring a search space to which DCI of an MCCH and an MTCH is transmitted to be the same as CSS used by a paging signal (i.e. Type1-NPDCCH CSS) or to be included in the corresponding CSS. As one specific example, with respect to a search space to which control information (DCI) of an MCCH or MTCH is transmitted and a search space to which paging-related DCI (i.e. paging DCI) is transmitted, the same candidate resource element mapping and a set of candidate repetition number applied to subframe repetition may be applied within one subframe.

In this case, a UE in the idle mode, without involving additional separate blind decoding (BD), may distinguish paging DCI that the UE has been watching so far (in other words, which has been being monitored) and DCI of an MCCH or DCI of an MTCH from each other by using CRC masking with different RNTI values. As one example, the different RNTI values may be configured as P-RNTI for the case of paging, SC-RNTI for the case of an MCCH, and G-RNTI for the case of an MTCH.

Differently from the description above, since a DCI format related to SC-PtM is set (i.e. configured) to the DCI format N2, a UE in the connected mode may be requested to perform an additional operation compared with an existing operation (for example, a legacy NB-IoT operation) to watch (i.e. monitor) control information of an MCCH or control information of an MTCH transmitted according to the DCI format N2. At this time, the additional operation may be described as follows.

A UE in the connected mode may monitor the DCI format N1 by using Cell-RNTI (C-RNTI) to watch (i.e. detect) unicast control information. At this time, when DCI related to SC-PtM (i.e. MCCH (i.e., SC-MCCH) or MTCH (i.e., SC-MTCH) control) is transmitted to the same subframe, since the DCI is configured to have the size of the DCI format N2, the UE in the idle mode is unable to perform decoding of the DCI related to SC-PtM without employing additional blind decoding.

Therefore, the UE may have to give up acquiring information related to SC-PtM (i.e. control information) or given up acquiring unicast control information. At this time, it is necessary to determine a priority for which one to acquire first. First, it may be configured to determine whether to receive multicast (i.e. a signal, channel and/or information related to SC-PtM) according to a service type.

For example, in the case of firmware update with a high priority, a UE may be configured to receive multicast first, even if unicast (i.e. a signal, channel and/or information related to unicast) is set to be received later. In the case of unicast, a UE may notify of reception immediately through ACK/NACK (A/N) procedure; however, since the ACK/NACK procedure is not defined for the case of multicast, a UE has no other way to notify of reception until information is exchanged in a higher layer. Therefore, it may be more advantageous to configure a UE to receive multicast before unicast.

In another example, the priority may be determined according to the amount of unicast data transfer. If a UE currently receives an amount of unicast data exceeding a predetermined threshold value, the UE may be configured to continue to receive unicast transmission. Otherwise, the UE may be configured to receive multicast. This is so because a large amount of unicast data previously received are present in a buffer, and it is more burdensome to use a configuration method to receive the data again.

However, when a UE is capable of performing additional blind decoding, the UE may acquire information related to SC-PtM by additionally monitoring the DCI format N2 (i.e. DCI format for an MCCH or an MTCH) by using an SC-RNTI or G-RNTI. Also, when a UE is scheduled to receive a unicast PDSCH through an N-PDCCH already decoded through USS, the UE may continue to receive the unicast PDSCH rather than attempt to receive multicast in the corresponding interval.

Also, as described above, an N-PDCCH and/or N-PDSCH related to SC-PtM may overlap an N-PDCCH and/or N-PDSCH related to the unicast. At this time, it may be required to configure which of the two is received first (i.e. configuration for priority).

For example, when an N-PDSCH transmitting unicast and an N-PDSCH transmitting SC-PtM are transmitted to the same subframe (i.e. at the same timing), it may be configured as receiving multicast (i.e. an N-PDSCH transmitting SC-PtM). In other words, a UE may be configured to receive an N-PDSCH transmitting SC-PtM for the case above.

Also, even when an N-PDSCH transmitting unicast and an N-PDCCH transmitting scheduling information of SC-PtM are transmitted to the same subframe (i.e. at the same timing), it may be configured as receiving multicast (i.e. an N-PDCCH transmitting scheduling information of SC-PtM). In other words, a UE may be configured to receive an N-PDCCH transmitting scheduling information of SC-PtM for the case above.

Also, even when an N-PDCCH transmitting scheduling information of unicast and an N-PDSCH transmitting SC-PtM are transmitted to the same subframe (i.e. at the same timing), it may be configured as receiving multicast (i.e. an N-PDSCH transmitting SC-PtM). In other words, a UE may be configured to receive an N-PDSCH transmitting SC-PtM for the case above.

Also, even when an N-PDCCH transmitting scheduling information of unicast and an N-PDCCH transmitting scheduling information of SC-PtM are transmitted to the same subframe (i.e. at the same timing), it may be configured as receiving multicast (i.e. an N-PDCCH transmitting scheduling information of SC-PtM). In other words, a UE may be configured to receive an N-PDCCH transmitting scheduling information of SC-PtM for the case above.

In other words, when an N-PDSCH and/or N-PDCCH (or search space) related to SC-PtM overlaps an N-PDSCH and/or N-PDCCH (or search space) related to unicast, a UE may be configured to first receive the N-PDSCH and/or N-PDCCH (or search space) related to SC-PtM (i.e. multicast).

In another example, when an N-PDSCH transmitting unicast and an N-PDSCH transmitting SC-PtM are transmitted to the same subframe (i.e. at the same timing), it may be configured as receiving unicast (i.e. an N-PDSCH transmitting unicast). In other words, a UE may be configured to receive an N-PDSCH transmitting unicast for the case above.

Also, even when an N-PDSCH transmitting unicast and an N-PDCCH transmitting scheduling information of SC-PtM are transmitted to the same subframe (i.e. at the same timing), it may be configured as receiving unicast (i.e. an N-PDSCH transmitting unicast). In other words, a UE may be configured to receive an N-PDSCH transmitting unicast for the case above.

Also, even when an N-PDCCH transmitting scheduling information of unicast and an N-PDSCH transmitting SC-PtM are transmitted to the same subframe (i.e. at the same timing), it may be configured as receiving unicast (i.e. an N-PDCCH transmitting scheduling information of unicast). In other words, a UE may be configured to receive an N-PDCCH transmitting scheduling information of unicast for the case above.

Also, even when an N-PDCCH transmitting scheduling information of unicast and an N-PDCCH transmitting scheduling information of SC-PtM are transmitted to the same subframe (i.e. at the same timing), it may be configured as receiving unicast (i.e. an N-PDCCH transmitting scheduling information of unicast). In other words, a UE may be configured to receive an N-PDCCH transmitting scheduling information of unicast for the case above.

In other words, when an N-PDSCH and/or N-PDCCH (or search space) related to SC-PtM overlaps an N-PDSCH and/or N-PDCCH (or search space) related to unicast, a UE may be configured to first receive the N-PDSCH and/or N-PDCCH (or search space) related to unicast.

The method described above may be applied even when a PRB transmitting unicast is the same as a PRB transmitting SC-PtM and also be applied when a PRB transmitting unicast is different from a PRB transmitting SC-PtM. In other words, the aforementioned method may be applied not only for the second embodiment but also for the first embodiment described above (a method for performing multicast transmission in a PRB different from a unicast PRB). Further, an above-mentioned method for determining a priority for which one to receive between the unicast transmission and the multicast transmission may also be applied for the same PRB, but it should be understood that the method may also be applied when unicast and multicast are transmitted from different PRBs and at the same subframe.

Also, in various embodiments of the present invention, an MCCH change notification (i.e. an SC-MCCH change notification) is transmitted to CSS type 1 by using the DCI format N2. However, since the MCCH change notification is transmitted once over a very long time period and is transmitted from a subframe different from a subframe to which control information of the MCCH (i.e. DCI of the MCCH) is transmitted, a UE in the connected mode and/or idle mode may not encounter a problem of additional blind decoding (BD).

However, in various embodiments of the present invention, an N-PDCCH of an MCCH (i.e. an N-PDCCH having DCI of an SC-MCCH) may be transmitted at the same timing (i.e. subframe) at which the MCCH change notification is known to be transmitted from an eNB. In this case, when a DCI format payload size of an N-PDCCH carrying control information of the MCCH is configured to be different in view of a UE from a DCI format payload size of an N-PDCCH carrying information about an MCCH change notification, the UE may encounter an additional blind decoding problem.

Therefore, in this case, to satisfy the max BD requirement (of a UE), the following methods (method 1 and method 2) may be considered. At this time, the two methods (method 1 and method 2) may be divided into a method where RNTIs used for CRC masking of a DCI format of an N-PDCCH of an MCCH and a DCI format of an MCCH change notification are configured to be different from each other (method 1) and a method where the RNTIs are configured to be the same with each other.

Method 1: Method for Distinguishing DCI Formats by Using CRC Masking with Different RNTI Values First, described will be a method which sets (or configures) sizes of a DCI format payload of an N-PDCCH of an MCCH and a DCI format payload of an MCCH change notification to the DCI format N1 or DCI format N2 and distinguishes the DCI formats by using CRC masking with different RNTI values. In this case, a method for setting the DCI format payload sizes to be the same with each other may include a method using actually the same DCI format and a method using zero padding to make lengths of DCI formats equal to each other even if the DCI formats are different from each other.

For example, when DCI of an N-PDCCH of an MCCH uses DCI format N1, and DCI of an MCCH change notification uses DCI format N2, since the DCI format N2 is shorter than the DCI format N1, a method for applying zero padding to the DCI format N2 to set the payload size thereof to be the same as that of the DCI format N1 may be considered.

At this time, when the same search space is configured for two DCI formats (i.e. a DCI format of an N-PDCCH of an MCCH and a DCI format of an MCCH change notification), a UE may check (or acquire) scheduling information for an MCCH through one-time blind decoding and check information about an MCCH change notification. More specifically, a UE may acquire scheduling information for an MCCH from an N-PDCCH of the MCCH through CRC masking by using an SC-RNTI value and acquire information about an MCCH change notification from an N-PDCCH carrying information about the MCCH change notification through CRC masking by using a newly defined RNTI.

Method 2: Method for Using the Same RNTI Value but Distinguishing DCI Formats by Using a Flag Included in the Payload Thereof Different from method 1, described will be a method which sets (or configures) a DCI format payload of an N-PDCCH of an MCCH and a DCI format payload of an MCCH change notification to be the same (as the DCI format N1 or the DCI format N2) and distinguishes the DCI formats by using an explicit flag (for example, 1 bit) included in the payload although the same RNTI value is used. In this case, a method for setting the DCI format payload sizes to be the same with each other may include a method using actually the same DCI format and a method using zero padding to make lengths of DCI formats equal to each other even if the DCI formats are different from each other.

For example, when DCI of an N-PDCCH of an MCCH uses DCI format N1, and DCI of an MCCH change notification uses DCI format N2, since the DCI format N2 is shorter than the DCI format N1, a method for applying zero padding to the DCI format N2 to set the payload size thereof to be the same as that of the DCI format N1 may be considered.

At this time, the same search space may be configured for two DCI formats (i.e. a DCI format of an N-PDCCH of an MCCH and a DCI format of an MCCH change notification), and for both of an N-PDCCH carrying information about an NPDCCH of an MCCH and an MCCH change notification, only one SC-RNTI may be configured to be used. In this case, through an explicit flag included in an actual DCI payload, it may be configured to indicate whether it is an N-PDCCH of an MCCH or an N-PDCCH of an MCCH change notification. For example, the flag value of '1' may represent (or indicate) transmitting an N-PDCCH of an MCCH, and the flag value of '0' may represent transmitting information about an MCCH change notification (i.e. an N-PDCCH carrying information about an MCCH change notification). Apparently, the flag value may also be configured in the opposite way to the above.

Also, with respect to the method 1 and the method 2 for an MCCH change notification, the DCI format payload size set (or configured) to be the same with each other may be equal to the DCI format N1, the DCI format N2, or a DCI format to be newly defined (for example, DCI format Nm, where m is an integer).

Also, in various embodiments of the present invention, a search space of Paging DCI may overlap a search space of DCI for an MCCH or an MTCH. At this time, in order to prevent the number of blind decoding, which monitors a search space for DCI decoding from the point of view of a UE, from being increased, the following two methods may be considered.

In a first method, when the respective search spaces repeated through a plurality of subframes overlap with each other in the same subframe from the point of view of an eNB, a method which predetermines (or preconfigures) a starting subframe constituting each search space to be configured in the same manner may be considered. In other words, when a search space of Paging DCI and a search space of DCI for an MCCH or an MTCH overlap each other, the method may configure starting subframes of the two search spaces to be the same with each other. In this case, when the two search spaces overlap, a UE may decode the two DCIs simultaneously by using N-PDCCH samples stored in the same soft buffer only with a little increase of complexity.

However, from the point of view of an eNB, the starting subframe constituting each search space in which subframes are overlapped may not be predetermined (or preconfigured or predefined) to be configured in the same manner. In this case, when the starting subframe constituting each search space is started from the same subframe, a UE may be configured to decode two DCIs simultaneously without involving additional blind decoding. Or, when the starting subframe constituting each search space overlaps with each other and is started from a different subframe, the UE may be configured to select DCI to be decoded first between two DCIs according to their priority. As one example, the UE may be configured to first decode Paging DCI, or the network may configure the priority depending on the situation.

In a second method, from the point of view of an eNB, when individual search spaces repeated through a plurality of subframes are overlapped with each other in the same subframe, a method which predetermines (or preconfigures) a starting subframe and an ending subframe constituting each search space to be configured in the same manner may be considered. In other words, when a search space of Paging DCI and a search space of DCI for an MCCH or an MTCH overlap each other, the method may configure the starting and ending subframes of the two search spaces to be the same. In this case, when the two search spaces overlap with each other, a UE, expecting Paging DCI and DCI for an MCCH or MTCH to be transmitted (always) through the same search space, may (always) decode the two DCIs simultaneously without involving additional blind decoding.

However, from the point of view of an eNB, starting and ending subframes constituting the respective search spaces in which subframes are overlapped may not be predetermined (or preconfigured or predefined) to be configured in the same manner. In this case, when a starting and ending subframes constituting each search space are the same for all of the search spaces, a UE may be configured to decode two DCIs simultaneously without involving additional blind decoding. Or, when a starting and/or ending subframe constituting each search space are different for each search space, a UE may be configured to select DCI to be decoded first between two DCIs according to their priority. As one example, the UE may be configured to first decode Paging DCI, or the network may configure the priority depending on the situation.

The methods described above are not limited to specific DCI formats or specific search space types but may be applied wherever it is needed to configure so that two or more DCIs may be decoded simultaneously. Also, the same repetition level may be applied for a search space to which paging DCI is transmitted and a search space for scheduling an MCCH or MTCH.

Also, in various embodiments of the present invention, a method for transmitting an N-PDCCH transmitting control information of an MCCH (i.e. SC-MCCH) through multiple PRBs not from a single PRB may be considered. In other words, if an eNB transmits control information (i.e. DCI) of an MCCH by using a plurality of PRBs configured in a semi-static manner, each UE may check (or acquire) control information of an MCCH by selecting one PRB among a plurality of PRBs and check a G-RNTI value configured for each TMGI by decoding the MCCH. At this time, a plurality of PRBs used for transmitting control information of an MCCH may overlap a unicast PRB, paging PRB, or camp-on PRB being monitored by the respective UEs. In this case, the corresponding UE may decode an MCCH and control information thereof without frequency shift and/or unicast interruption.

Afterwards, a UE which has checked (or acquired) a G-RNTI value from the MCCH (or an N-PDSCH to which the MCCH is carried) may move to a PRB to which control information of an MTCH (i.e. SC-MTCH) is transmitted and check control information of the MTCH by using the G-RNTI value corresponding to the TMGI that the UE desires to receive. Afterwards, according to control information of the checked MTCH, the corresponding UE may decode the MTCH and receive MBMS data (i.e. multicast or broadcast data).

Also, a UE may acquire information about an MCCH change notification (i.e. SC-MCCH change notification) by monitoring a predefined (or preconfigured) CSS region in a PRB to which control information of the MCCH has been transmitted. At this time, the UE may be configured to monitor the CSS region by using an SC-RNTI value or other predefined (or preconfigured) RNTI value. Also, the DCI format N1 or DCI format N2 used in the legacy NB-IoT (i.e. NB-LTE) may be configured as a DCI format used in this case, or a new DCI format (i.e. DCI format Nm, where m is an integer) may be configured as the DCI format used this case.

Also, in various embodiments of the present invention, since coverage enhancement may be needed for part of UEs of the NB-LTE (or NB-IoT) in some cases, coverage enhancement (CE) level also needs to be considered for multicast transmission (i.e. SC-PtM transmission). In other words, when SC-PtM scheme is applied to the NB-LTE (i.e. NB-IoT) system, a method for configuring the CE level of an N-PDCCH and/or N-PDSCH related to SC-PtM in an efficient manner may have to be considered. Here, an N-PDCCH and N-PDSCH related to SC-PtM may indicate an N-PDCCH transmitting control information of an MCCH (SC-MCCH) and/or MTCH (SC-MTCH) and an N-PDSCH transmitting data of an MCCH (SC-MCCH) and/or MTCH (SC-MTCH).

At this time, a method for determining a CE level of an N-PDCCH and/or N-PDSCH for SC-PtM may be divided into the following two methods (method 1 and method 2) according to the number of configured CE levels (for example, single CE level and multiple CE levels).

Method 1: Method for Using a Single CE Level

First, a method for configuring a CE level of an N-PDCCH or N-PDSCH carrying SC-PtM information (i.e. SC-PtM control information or data) as a single CE level will be described. At this time, CE level may indicate a repetition number set of an N-PDCCH or N-PDSCH or a maximum repetition number. Therefore, change of a CE level may indicate change of a repetition number set of an N-PDCCH or N-PDSCH or change of a maximum repetition number. Also, a repetition number set of an N-PDCCH or N-PDSCH; or a maximum repetition number corresponding to each CE level may be defined (or configured). At this time, using a single CE level (i.e. one CE level) brings an advantage that complexity is low from the system implementation point of view. Specific examples using a single CE level are as follows.

For example, a method for configuring a CE level used in a system to a fixed CE level may be considered. In other words, the method may indicate a method for configuring a multicast CE level of NB-IoT for all of the cells to a specific fixed CE level. Here, a fixed CE level may indicate a repetition number set corresponding to a fixed CE level or a maximum repetition number.

The method for using a fixed CE level may be applied to determine a CE level of an N-PDCCH carrying control information of an MCCH or control information of an MTCH. When the fixed CE level is set to the maximum CE level (i.e. a repetition number set or maximum repetition number corresponding to the maximum CE level), the network may support a service for most of UEs belonging to the corresponding system (or cell). In this case, the corresponding method may be applied in an advantageous manner for a system in which a plurality of UEs are present (or located) at locations where channel conditions are poor (for example, underground passage or warehouse).

In another example, a method by which each cell is configured to a single CE level in a cell-specific manner, and an eNB informs a UE of the corresponding CE level (or carries the corresponding CE level to the UE) through system information (for example, SIB) may be considered. The method for using a CE level configured in a cell-specific manner may be applied to determine a CE level of an N-PDCCH carrying control information of an MCCH or control information of an MTCH.

At this time, an eNB may determine an average channel condition by figuring out channel characteristics or channel properties of UEs configured to the eNB and locations of the corresponding UEs. Afterwards, the eNB may be configured so that it configures a CE level corresponding to the channel condition in a semi-static manner and informs a UE of the configured CE level through system information. Since a CE level may be determined in a cell-specific manner when the corresponding method is used, an advantageous effect may be obtained in that complexity is low from the system implementation point of view, and unnecessary repetitions are reduced.

Method 2: Method for Using Multiple CE Levels

Next, a method for configuring a CE level of an N-PDCCH or N-PDSCH carrying SC-PtM information to multiple CE levels will be described. Using multiple CE levels may indicate setting a CE level differently according to a channel condition of a UE and/or multicast service type. In the case of the corresponding method, an advantageous effect may be achieved in that unnecessary repetitions are reduced, and an appropriate CE level is applied depending on the situation. Specific examples using multiple CE levels are described as follows.

For example, a configuration method which assumes that a CE level configured for each TMGI (or G-RNTI or service type) is known in advance (or predefined) between an eNB and a UE may be considered. The method may be applied to determine a CE level of an N-PDSCH carrying control information of an MTCH and/or a CE level of an N-PDSCH carrying an MTCH. In this case, the CE level is configured differently according to TMGI (or G-RNTI or service type) which may be known (or acquired) through an N-PDSCH of an MCCH (i.e. an N-PDSCH through which an MCCH is carried).

As one example, if a multicast service type is an important update which has to be performed immediately by all of the UEs, the CE level may be set as large as possible so that UEs with poor channel conditions may also receive the service. Or if a multicast service type is a group call for UEs located in a good channel condition, the CE level may be set to a minimum CE level at which the corresponding UEs may receive the service so that unnecessary repetitions may be prevented.

The CE level configuration information for each TMGI (or G-RNTI or service type) as described above may be transmitted (or carried) to a UE through RRC signaling and/or MCCH.

As another example, a method for configuring a CE level for each UE group may be considered. The method may be applied to determine a CE level of an N-PDCCH carrying control information of an MCCH or MTCH and/or a CE level of an N-PDSCH carrying an MCCH or MTCH. In this case, an eNB may be configured to transmit an N-PDCCH carrying control information of an MCCH or MTCH and/or an N-PDSCH carrying an MCCH or MTCH at different CE levels through different PRBs. At this time, the CE levels used may be configured independently for each cell, but (configuration) information for a CE level transmitted to a specific PRB may be configured to be transmitted through system information to all of the UEs. A UE(s) which has received the corresponding system information may be configured to select a desired CE level and receive control information of an MCCH or MTCH by moving to a PRB to which the corresponding control information is transmitted. In the case of the corresponding method, an advantage may be achieved that each UE may select a desired CE level according to a channel condition of the UE.

Also, an eNB may also be configured to transmit control information of an MCCH or MTCH by using different CE levels at different subframes (i.e. timing) of the same PRB rather than different PRBs. At this time, although the CE levels used may be configured independently for each cell as described above, a subframe (i.e. information about the subframe) to which an N-PDCCH corresponding to a different CE level (i.e. having a different CE level) is allocated may be configured to be transmitted to all of the UEs through system information. A UE(s) which has received the corresponding system information may be configured to select a desired CE level and receive control information of an MCCH or MTCH according to the timing at which the corresponding subframe is transmitted. In the case of the corresponding method, from the point of view of an eNB, an advantageous effect may be obtained in that an inefficient procedure which requires sending the same information by using a plurality of PRBs is reduced.

Also, in various embodiments of the present invention, various methods for transmitting an SC-MCCH change notification may be considered.

First, in the case of the legacy LTE(-A) system, an eNB transmits (or carries) DCI scrambled with an SC-N-RNTI to a UE through a PDCCH for notification of an SC-MCCH change. Also, as the corresponding DCI is transmitted through a common search space (CSS), a UE monitoring the CSS by default may receive the SC-MCCH change notification (i.e. information related to the SC-MCCH change notification) without involving an additional blind decoding (BD) operation.

Meanwhile, in the case of NB-IoT (i.e. NB-LTE) system, if it is assumed that an eNB transmits additional DCI through a specific CSS for notification of an SCCH change, a UE may acquire information about the SC-MCCH change notification (i.e. information related to the SC-MCCH change notification) by performing an additional blind decoding operation. Since additional blind decoding may invoke unnecessary overhead on a UE, methods for transmitting information about an SC-MCCH change notification differently from an existing (i.e. the legacy LTE(-A)) system may need to be considered for the NB-IoT system.

In this case, as a method for transmitting information about the SC-MCCH change notification, a method for transmitting through DCI scheduling an SC-MTCH (for example, DCI format N1) (method 1), method for transmitting through DCI scheduling an SC-MCCH (for example, DCI format N2) (method 2), method for transmitting through SC-MCCH payload (i.e. an N-PDSCH carrying an SC-MCCH) (method 3), method for transmitting through SC-MTCH payload (i.e. an N-PDSCH carrying an SC-MCCH) (method 4), and method for transmitting through a system information block (SIB) (method 5) may be considered. In other words, the method may be classified according to an entity transmitting SC-MCCH change information. In what follows, the methods above will be described in detail.

Method 1: Method for Transmitting Through DCI Scheduling an SC-MTCH

First, a method for transmitting information about an SC-MCCH change notification by an eNB to a UE through DCI scheduling an SC-MTCH will be described.

First, a method for adding an SC-MCCH change notification field to the corresponding DCI field (i.e. DIC scheduling an SC-MTCH) may be considered. For example, when the number of bits to be transmitted by an SC-MCCH is n (i.e. n bits), an SC-MCCH change notification field (n bits) may be added to the corresponding DCI. When an SC-MCCH is changed, an eNB may carry (or transmit) information (i.e. information indicating that the SC-MCCH has been changed) to a UE by using the corresponding field. The corresponding method provides an advantage that information about an SC-MCCH change notification may be carried without increasing the number of blind decoding of a UE.

Second, a method for notifying of change of an SC-MCCH as the corresponding DCI indicates a specific value may be considered. For example, by using a combination of reserved bits among existing DCI fields, the corresponding bits may be configured to indicate a specific value. Through the configuration, the corresponding DCI may be configured to carry information about an SC-MCCH change notification (simultaneously) while scheduling an SC-MTCH (i.e. an N-PDSCH carrying an SC-MTCH). In other words, an eNB may schedule an SC-MTCH by using the corresponding DCI and carry information about an SC-MCCH change notification. The corresponding method provides an advantage in that differently from the first method, the method does not require an additional DCI field and carries information about an SC-MCCH change notification without increasing the number of blind decoding of a UE. Also, the corresponding method may be used efficiently when the amount of information to be carried through an SC-MCCH change notification is not large.

Third, a method for scrambling the corresponding DCI by using a specific RNTI value according to whether an SC-MCCH has been changed may be considered. For example, in the case of an existing system (i.e. the legacy LTE(-A) system), a UE may acquire a G-RNTI value for each TMGI from the payload (i.e. N-PDSCH) carrying an SC-MCCH and distinguish (or identify or check) DCI scheduling an SC-MTCH by monitoring a search space by using the corresponding G-RNTI value.

Meanwhile, in the case of the method using a specific RNTI, a UE may descramble DCI by using the specific RNTI value (i.e. the RNTI value scrambling the corresponding DCI when an SC-MCCH is changed) and using a G-RNTI value corresponding to a TMGI that the UE desires to receive. At this time, if the corresponding DCI is descrambled into a G-RNTI value, the UE may determine that only the scheduling information for an SC-MTCH has been transmitted. Differently from the above, if the corresponding DCI is descrambled into the specific RNTI value, the UE may determine that scheduling information for an SC-MTCH and information about an SC-MCCH change notification have been transmitted together. Here, the specific RNTI value may be a previously used SC-N-RNTI value, a specific G-RNTI value different from G-RNTI values corresponding to all of the TMGIs being transmitted (i.e. supported) from the system, or a newly defined RNTI value. The corresponding method provides an advantage in that it does not require an additional DCI field and carries information about an SC-MCCH change notification without increasing the number of blind decoding of a UE.

The methods have been classified only for the purposes of illustration, and carrying information about an SC-MCCH change notification through DCI scheduling an SC-MTCH may be performed not only by the methods above but also by various other methods.

Method 2: Method for Transmitting Through DCI Scheduling an SC-MCCH

Different from the method above, a method for transmitting information about an SC-MCCH change notification by an eNB to a UE through DCI scheduling an SC-MCCH will be described.

First, a method for adding an SC-MCCH change notification field to the corresponding DCI field (i.e. DIC scheduling an SC-MCCH) may be considered. For example, when the number of bits to be transmitted by an SC-MCCH is n (i.e. n bits), an SC-MCCH change notification field (n bits) may be added to the corresponding DCI. When an SC-MCCH is changed, an eNB may carry (or transmit) information (i.e. information indicating that the SC-MCCH has been changed) to a UE by using the corresponding field. The corresponding method provides an advantage that information about an SC-MCCH change notification may be carried without increasing the number of blind decoding of a UE.

Second, a method for notifying of change of an SC-MCCH as the corresponding DCI indicates a specific value may be considered. For example, by using a combination of reserved bits among existing DCI fields, the corresponding bits may be configured to indicate a specific value. Through the configuration, the corresponding DCI may be configured to carry information about an SC-MCCH change notification (simultaneously) while scheduling an SC-MCCH (i.e. an N-PDSCH carrying an SC-MCCH). In other words, an eNB may schedule an SC-MCCH by using the corresponding DCI and carry information about an SC-MCCH change notification. The corresponding method provides an advantage in that differently from the first method, the method does not require an additional DCI field and carries information about an SC-MCCH change notification without increasing the number of blind decoding of a UE. Also, the corresponding method may be used efficiently when the amount of information to be carried through an SC-MCCH change notification is not large.

Third, a method for scrambling the corresponding DCI by using a specific RNTI value according to whether an SC-MCCH has been changed may be considered. In the case of the corresponding method, a UE may descramble DCI by using the specific RNTI value (i.e. the RNTI value scrambling the corresponding DCI when an SC-MCCH is changed) and using an S-RNTI value. At this time, if the corresponding DCI is descrambled into an SC-RNTI value, the UE may determine that only the scheduling information for an SC-MCCH has been transmitted. Differently from the above, if the corresponding DCI is descrambled into the specific RNTI value, the UE may determine that scheduling information for an SC-MCCH and information about an SC-MCCH change notification have been transmitted together.

Here, the specific RNTI value may be a previously used SC-N-RNTI value or a newly defined RNTI value. The corresponding method provides an advantage in that it does not require an additional DCI field and carries information about an SC-MCCH change notification without increasing the number of blind decoding of a UE.

Fourth, when an SC-MCCH is changed, a method for transmitting by changing a transmission resource of an N-PDCCH to which DCI scheduling an SC-MCCH is transmitted may be considered. At this time, a transmission resource of an N-PDCCH may indicate a subframe to which the N-PDCCH is to be transmitted or a decoding candidate. More specifically, the corresponding method may be a method by which a subframe to which DCI scheduling an SC-MCCH which has been being transmitted or a decoding candidate is changed to a different subframe or a different decoding candidate. Similarly, the corresponding method may be a method for predefining (or preconfiguring) a specific subframe or specific decoding candidate between an eNB and a UE; and configuring DCI scheduling an SC-MCCH to be transmitted through the corresponding subframe or corresponding decoding candidate. As described in detail above, when a transmission resource is changed, a UE may recognize (or check) that an SC-MCCH has been changed. The corresponding method is advantageous in that an additional DCI field is not required, and a descrambling procedure using an additional RNTI is not required to be performed.

The methods have been classified only for the purposes of illustration, and carrying information about an SC-MCCH change notification through DCI scheduling an SC-MTCH may be performed not only by the methods above but also by various other methods.

Method 3: Method for Transmitting Through SC-MCCH Payload (i.e. an N-PDSCH)

Also, a method for transmitting information about an SC-MCCH change notification through payload (i.e. an N-PDSCH) of an SC-MCCH rather than DCI scheduling an SC-MCCH or SC-MTCH may be considered. More specifically, the corresponding method may be a method which transmits information about an SC-MCCH change notification at a specific timing predetermined (or predefined) between an eNB and a UE or determined through higher layer signaling (for example, RRC signaling). Here, the specific timing may indicate a specific subframe.

In this case, a UE may receive payload (i.e., an N-PDSCH) about an SC-MCCH at the specific timing while at the same time, additionally receiving information about an SC-MCCH change notification. Accordingly, the UE is not required to additionally monitor a search space to acquire information about an SC-MCCH change notification. Also, the corresponding method is advantageous in that since it uses SC-MCCH payload, space for transmitting an SC-MCCH change notification (i.e. information about an SC-MCCH change notification) may be configured sufficiently.

Method 4: Method for Transmitting Through SC-MTCH Payload (i.e. an N-PDSCH)

Also, a method for transmitting information about an SC-MCCH change notification through payload (i.e. an N-PDSCH) of an SC-MTCH may be considered. More specifically, the corresponding method may be a method which transmits information about an SC-MCCH change notification at a specific timing predetermined (or predefined) between an eNB and a UE or determined through higher layer signaling (for example, RRC signaling). Here, the specific timing may indicate a specific subframe.

In this case, a UE may receive SC-MTCH payload (i.e., an N-PDSCH) at the specific timing while at the same time, additionally receiving information about an SC-MCCH change notification. Accordingly, the UE is not required to additionally monitor a search space to acquire information about an SC-MCCH change notification. Also, the corresponding method is advantageous in that since it uses SC-MTCH payload, space for transmitting an SC-MCCH change notification (i.e. information about an SC-MCCH change notification) may be configured sufficiently.

Method 5: Method for Transmitting Through a System Information Block (SIB)

Also, a method for transmitting information about an SC-MCCH change notification through a system information block (SIB) rather than DCI or payload of an SC-MCCH or SC-MTCH may be considered. Here, the SIB may indicate an information block (or message) used for transmitting system information. In this case, if an SC-MCCH is changed, an eNB may be configured to transmit an SIB change notification to a UE and transmit a new SIB (i.e. an SIB including information about an SC-MCCH change notification) to the UE. Accordingly, the UE may receive a new SIB including information about an SC-MCCH change notification. The corresponding method is advantageous in that since an SIB carries information about an SC-MCCH change notification, sufficient space for transmitting information about an SC-MCCH change notification may be configured.

The various methods for transmitting information about an SC-MCCH change notification described above may be applied to various embodiments of the present invention described above. Also, the methods may be used not only separately but also in combination of the methods.

Also, in various embodiments of the present invention, a method (i.e. a control-less SC-MCCH transmission method) which does not use an N-PDCCH for transmitting SC-MCCH information (i.e. SC-MCCH) may be considered. In this case, a method for preconfiguring a region to which the corresponding information (i.e. SC-MCCH information) is transmitted instead of using an N-PDCCH for transmitting an SC-MCCH may be considered. For example, when the initial SC-MCCH scheduling information is transmitted through an SIB, a UE is not required to monitor DCI for scheduling an SC-MCCH. In this case, compared with the legacy NB-IoT, an advantage is obtained in that a UE is not required to perform additional blind decoding. At this time, when scheduling information for an SC-MCCH is changed, it is necessary to consider a method for carrying (or informing of) the corresponding change to a UE.

For example, a method for configuring a UE to receive (or read) an SIB again by performing SIB change notification through a paging signal may be considered. More specifically, since SC-MCCH scheduling information is transmitted through an SIB, an eNB may be configured to perform SIB change notification through a paging signal. In this case, a UE may be configured to check (or identify) scheduling information about a changed SC-MCCH by reading an SIB again (i.e. receiving a new SIB). The corresponding method may be used when a UE is in the idle mode (for example, RRC idle mode) where the UE monitors a common search space (CSS) in which a paging signal is scheduled.

As another example, a method for transmitting an indication indicating change of SC-MCCH scheduling information through new DCI or predefined, specific DCI may be considered. More specifically, like the methods for transmitting information about an SC-MCCH change notification described above, a method for adding an SC-MCCH scheduling change notification field to the corresponding DCI field and/or a method for notifying of change of SC-MCCH scheduling information as the corresponding DCI indicates a specific value may be considered. At this time, when a UE receives an indication indicating change of SC-MCCH scheduling information, the UE may be configured to read (or receive) an SIB including SC-MCCH scheduling information (i.e. SC-MCCH scheduling information).

Here, the predefined, specific DCI may be DCI transmitting information about an SC-MCCH change notification. At this time, the SC-MCCH scheduling change information may be configured to be carried by the corresponding DCI by using an additional field (for example, 1 bit) or carried without involving an additional field when DCI indicates a specific value. In the case of a method for transmitting an indication indicating change of SC-MCCH scheduling information through the new DCI or predefined, specific DCI, an eNB may have to transmit SC-MCCH scheduling information only when the SC-MCCH scheduling information is changed. Therefore, the corresponding method provides an advantage in that it does not need to transmit scheduling information each time (as in the existing method).

As yet another example, a method for transmitting an indication indicating change of SC-MCCH scheduling information and SC-MCCH scheduling information through new DCI or predefined, specific DCI may be considered. More specifically, an SC-MCCH scheduling change notification field and SC-MCCH scheduling field may be added to the corresponding DCI field. At this time, a UE may be configured to receive an indication indicating change of SC-MCCH scheduling information and also receive SC-MCCH scheduling information without necessarily reading (or receiving) an SIB.

Here, the predefined, specific DCI may be DCI transmitting information about an SC-MCCH change notification. At this time, SC-MCCH scheduling change information and actual SC-MCCH scheduling information may be carried by using an additional field (for example, one or more bits) of the corresponding DCI. In the case of the method for transmitting an indication indicating change of SC-MCCH scheduling information and SC-MCCH scheduling information through the new DCI or predefined, specific DCI, an eNB may have to transmit SC-MCCH scheduling information only when SC-MCCH scheduling information has been changed. Therefore, the corresponding method provides an advantage in that it does not need to transmit scheduling each time (as in the existing method).

Also, as a method for distinguishing the predefined, specific DCI in the embodiments described above, a CRC masking operation using a new RNTI value (for example, SC-N-RNTI value) instead of a previously used RNTI value may be performed. In this case, an advantage is obtained that a UE becomes able to distinguish DCI notifying of change of scheduling for an SC-MCCH from existing DCI without involving additional blind decoding (BD). Also, a method, which applies a payload size that is the same as existing DCI monitored by a UE to the corresponding DCI but uses a field for distinguishing whether the corresponding DCI is intended for SC-MCCH scheduling change notification or other purpose, may also be considered. The corresponding method also provides an advantage in that it is able to carry (or inform of) information related to change of SC-MCCH scheduling to a UE without involving the UE's additional blind decoding.

Also, in various embodiments of the present invention, with respect to transmitting control information about an SC-MCCH, a method which does not transmit SC-MCCH scheduling information each time through an N-PDCCH may also be considered. In other words, an eNB does not have to transmit DCI including SC-MCCH scheduling information each time through an N-PDCCH. In this case, a method for associating an SIB with DCI for an SC-MCCH change notification (i.e. DCI including information about an SC-MCCH change notification) may be used (or applied).

For example, a method for transmitting SC-MCCH scheduling information through an SIB but transmitting DCI for an SC-MCCH change notification only when any of SC-MCCH scheduling information and SC-MCCH payload (i.e. N-PDSCH) is changed may be considered. In this case, the period of a position at which the DCI for the SC-MCCH change notification may be transmitted (i.e. timing, occasion, or subframe) may be configured to a fixed value. Also, with respect to the DCI for the SC-MCCH change notification, an SC-N-RNTI or SC-RNTI may be used.

More specifically, through the initial (i.e. the first) SIB, a UE may receive (or acquire) SC-MCCH scheduling information and information about a period and/or subframe position at which DCI for an SC-MCCH change notification may be transmitted. Afterwards, a UE may check (or identify) SC-MCCH payload of an N-PDSCH by using the corresponding SC-MCCH scheduling information. At this time, an eNB may be configured to transmit DCI for an SC-MCCH change notification only when any of SC-MCCH scheduling information and SC-MCCH payload is changed. Here, the period of a position at which the corresponding DCI may be transmitted is configured to be the same as that informed to a UE through the initial SIB (i.e. a period that the UE has received).

Also, a 1-bit field (for example, an on-off form) for a change notification may be configured in the DCI for an SC-MCCH change notification. Or, a separate field for a change notification may not be configured within the DCI since change may be carried only through transmission of the DCI for an SC-MCCH change notification. In other words, when transmission of the corresponding DCI itself indicates whether an SC-MCCH has been changed or not, it is not necessary to configure a separate, additional field for a change notification within the corresponding DCI. However, since it is efficient to maintain the size of DCI to a fixed value from the point of view of blind decoding of a UE, a zero padding operation may be performed on the corresponding DCI for consistency with other DCI size.

Afterwards, a UE may be configured to attempt detection of the corresponding DCI by using an SC-N-RNTI (or SC-RNTI) at each position to which the corresponding DCI may be transmitted. When a UE detects the corresponding DCI, the UE may check scheduling information (i.e. SC-MCCH scheduling information) by moving to an SIB (i.e. by using an SIB). Afterwards, a UE may be configured to attempt detection of an N-PDSCH (i.e. an N-PDSCH to which an SC-MCCH is carried) according to checked scheduling information.

The method described in the embodiment above provides an advantage in that overhead of DCI may be reduced, and SC-MCCH scheduling information may be transmitted through an SIB which has a sufficient space.

As another example, a method for transmitting SC-MCCH scheduling information through DCI for an SC-MCCH change notification but transmitting DCI for an SC-MCCH change notification only when any of SC-MCCH scheduling information and SC-MCCH payload (i.e. N-PDSCH) is changed may be considered. In this case, the period of a position at which the DCI for the SC-MCCH change notification may be transmitted (i.e. timing, occasion, or subframe) may be configured to a fixed value. Also, with respect to the DCI for the SC-MCCH change notification, an SC-N-RNTI or SC-RNTI may be used.

More specifically, through the initial (i.e. the first) SIB, a UE may receive (or acquire) information about a period and/or subframe position at which DCI for an SC-MCCH change notification may be transmitted. Here, the corresponding DCI transmits SC-MCCH scheduling information. Afterwards, a UE may check SC-MCCH scheduling information, through which the UE checks SC-MCCH payload of an N-PDSCH. At this time, an eNB may be configured to transmit DCI for an SC-MCCH change notification only when any of SC-MCCH scheduling information and SC-MCCH payload is changed. Here, the period of a position at which the corresponding DCI may be transmitted is configured to be the same as a period that the UE has received through the initial SIB.

Also, a 1-bit field (for example, an on-off form) for a change notification may be configured in the DCI for an SC-MCCH change notification. Or, a separate field for a change notification may not be configured within the DCI since change may be carried only through transmission of the DCI for an SC-MCCH change notification. In other words, when transmission of the corresponding DCI itself indicates whether an SC-MCCH has been changed or not, it is not necessary to configure a separate, additional field for a change notification within the corresponding DCI. However, since it is efficient to maintain the size of DCI to a fixed value from the point of view of blind decoding of a UE, a zero padding operation may be performed on the corresponding DCI for consistency with other DCI size.

Afterwards, a UE may be configured to attempt detection of the corresponding DCI by using an SC-N-RNTI (or SC-RNTI) at each position to which the corresponding DCI may be transmitted. When a UE detects the corresponding DCI, the UE may reconfirm SC-MCCH scheduling information through the corresponding DCI. Afterwards, a UE may be configured to attempt detection of an N-PDSCH (i.e.

an N-PDSCH to which an SC-MCCH is carried) according to checked scheduling information. The method described in the embodiment above may reduce DCI overhead.

In the embodiments above, through the initial SIB, SC-MCCH scheduling information and/or a period and/or subframe position at which DCI for an SC-MCCH change notification is transmitted may be configured to be larger than the period at which SC-MCCH payload (i.e. N-PDSCH) is transmitted or configured adaptively by the network.

Also, in the embodiments above, instead of using a method for configuring an eNB to transmit DCI for an SC-MCCH change notification only when any of SC-MCCH scheduling information and SC-MCCH payload is changed, a method for configuring to transmit, at each period, DCI for an SC-MCCH change notification having a period larger than that at which SC-MCCH payload is transmitted may be applied. In this case, it may be necessary to configure a 1-bit field (for example, an on-off form) for a change notification (i.e. which indicates change of an SC-MCCH) within the DCI for an SC-MCCH change notification. Afterwards, a UE may be configured to attempt detection of the corresponding DCI by using an SC-N-RNTI (or SC-RNTI) at each position to which the corresponding DCI may be transmitted.

At this time, when a UE detects the corresponding DCI and confirms (or identifies) an SC-MCCH change notification, the UE may reconfirm SC-MCCH scheduling information through an SIB or the corresponding DCI. Afterwards, the UE may be configured to attempt detection of an N-PDSCH (i.e. an N-PDSCH to which an SC-MCCH is transmitted) according to the confirmed scheduling information. On the other hand, when the UE detects the corresponding DCI but confirms that an SC-MCCH has not been changed, the UE may be configured to continue to receive SC-MCCH payload by using scheduling information received (i.e. checked) previously until the UE checks the next (i.e. subsequently transmitted) DCI for an SC-MCCH change notification.

From the point of view of the network (for example, in view of an eNB), the corresponding method provides an advantage in that DCI overhead related to DCI transmission may be reduced. Also, from the point of view of a UE, too, the corresponding method provides an advantage in that overhead due to DCI detection may be reduced as the transmission period of DCI for an SC-MCCH change notification is configured to be longer than a transmission period of SC-MCCH payload.

Figure 14:
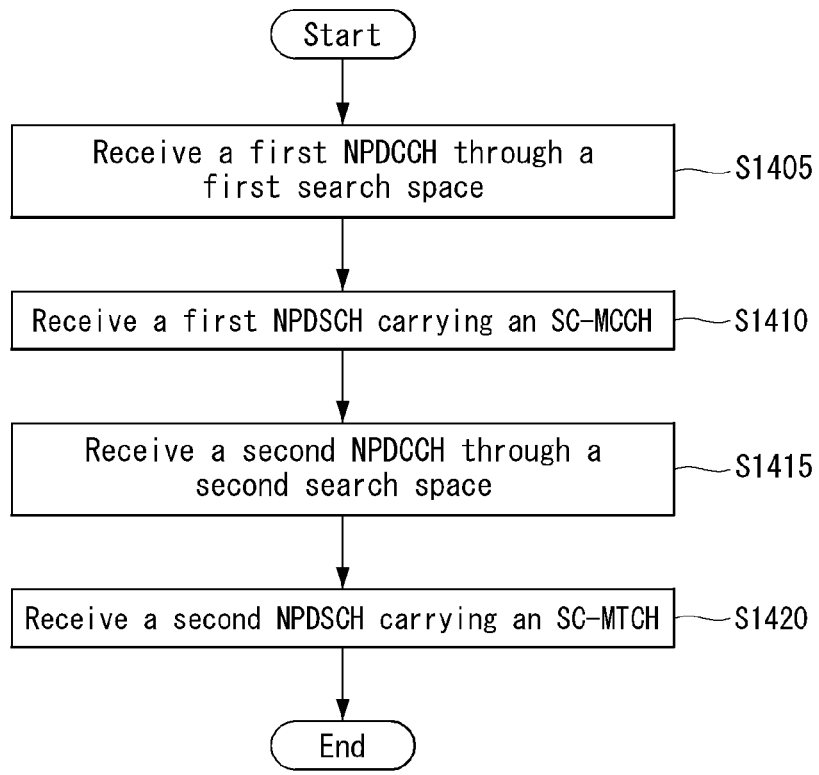
FIG. 14 illustrates an operation flow diagram of a UE transmitting/receiving data in a wireless communication system supporting NB-IoT to which a method proposed by the present specification may be applied.

FIG. 14 illustrates an operation flow diagram of a UE transmitting/receiving data in a wireless communication system supporting NB-IoT to which a method proposed by the present specification may be applied. FIG. 14 is introduced only for the convenience of description and is not intended to limit the technical scope of the present invention.

Referring to FIG. 14, it is assumed that in order to receive an NPDCCH (i.e. N-PDCCH), a UE monitors a search space (for example, USS, CSS, GSS) configured for the corresponding NPDCCH. At this time, the monitoring process may refer to a process for receiving the corresponding NPDCCH as the UE decodes the corresponding NPDCCH candidates by using a specific identifier (i.e. an identifier configured for an NPDCCH that the UE wants to receive).

At the S1405 step, a UE receives a first NPDCCH through a first search space (configured for an SC-MCCH (i.e. MCCH)). In other words, a UE may receive the first NPDCCH by monitoring the first search space configured for the first NPDCCH for an SC-MCCH. Here, the first NPDCCH includes first control information (for example, DCI corresponding to the DCI format N2) for scheduling of a first NPDSCH (i.e. a first N-PDSCH) carrying the SC-MCCH.

Afterwards, at the S1410 step, the UE receives (or decodes) the first NPDSCH based on the first control information. Accordingly, the UE may acquire the SC-MCCH (i.e. information carried by the SC-MCCH (SC-MCCH information)) through the first NPDSCH (or by receiving or decoding the first NPDSCH). Through the SC-MCCH, the UE may acquire a group identifier (for example, G-RNTI) and configuration information for a carrier (i.e., a PRB) allocated with respect to an SC-MTCH.

Afterwards, at the S1415 step, the UE receives a second NPDCCH through a second search space (configured with respect to an SC-MTCH (i.e., MTCH)) by using the group identifier. In other words, the UE may receive the second NPDCCH by monitoring the second search space configured with respect to the second NPDCCH for an SC-MTCH. Here, the second NPDCCH includes second control information (for example, DCI corresponding to the DCI format N2) for scheduling of a second NPDSCH (i.e. a second N-PDSCH) carrying the SC-MTCH.

Afterwards, at the S1420 step, the UE receives (or decodes) the second NPDSCH based on the second control information. Accordingly, the UE may acquire the SC-MTCH (i.e., information carried by an SC-MCCH (i.e. multicast or broadcast information)) through (by decoding) the second NPDSCH.

At this time, when a time period (for example, search space or subframe, etc) configured for at least one of a third NPDCCH or third NPDSCH overlaps at least one of the first search space, a time period configured for the first NPDSCH, the second search space, or a time period configured for the second NPDSCH, the UE first receives at least one of the third NPDCCH or the third NPDSCH. Here, the third NPDCCH and/or the third NPDSCH is a channel configured for either of paging or random access.

In other words, the UE may receive a paging-related channel first when a paging-related NPDCCH and/or NPDSCH overlaps an SC-PtM (i.e. SC-MCCH or SC-MTCH)-related NPDCCH and/or NPDSCH. That is, in the case above, the UE is not required to monitor a search space (i.e. the first search space or second search space) with respect to an SC-PtM-related NPDCCH or receive an SC-PtM-related NPDSCH. This is so because, in the case of a UE in the idle mode, receiving paging information (according to a DRX period of the UE) is very important for subsequent procedures. In this case, the time period configured for the third NDPCCH may include a search space monitored by using a paging identifier.

Also, when an NPDCCH and/or NPDSCH related to random access overlaps an NPDCCH and/or NPDSCH related to SC-PtM, the UE may first receive a channel related to random access. In other words, in the case above, the UE is not required to monitor a search space (i.e. the first search space or second search space) with respect to an SC-PtM-related NPDCCH or receive an SC-PtM-related NPDSCH. In this case, when the third NPDCCH and the third NPDSCH are configured for random access, the time period configured for the third NPDCCH may include a search space monitored by using a cell identifier.

Also, the UE may receive a system information block (for example SIB 20 for NB-IoT use) including carrier configuration information (for example, the system information representing a representative PRB for an SC-MCCH described above) representing a carrier through which the first NPDCCH and the first NPDSCH are carried. Through the system information block, the UE may acquire an SC-MCCH (i.e. SC-MCCH information) through a carrier identified (or determined) through the corresponding carrier configuration.

Also, the first control information may further include information related to a change notification for the SC-MCCH (for example, information indicating the MCCH change notification described above). Here, the information related to the change notification for the SC-MCCH may be composed of 1 bit (for example, a flag).

Also, the UE may receive system information including configuration information about at least one repetition number of the first PDCCH, first PDSCH, second PDCCH, or second PDSCH. Here, the repetition number may be configured in a cell-specific manner. Or, the UE may receive system information including configuration information about at least one repetition number of the second PDCCH or second PDSCH. In this case, the repetition number may be configured according to a group identifier (i.e. a group identifier carried through an SC-MCCH).

Also, the first PDCCH, first PDSCH, second PDCCH, and second PDSCH may be transmitted from a carrier (for example, an anchor PRB) to which a synchronization signal and a Physical Broadcast Channel (PBCH) are transmitted and other carrier (for example, a representative PRB or multicast PRB (M-PRB)). Also, the first control information may be downlink control information corresponding to the DCI format N2, and the second control information may be downlink control information corresponding to the DCI format N1.

At this time, the third NPDCCH may include third control information for scheduling of the third NPDSCH. Here, the third control information may comprise at least one of the first control information or the second control information and a different number of information bits. For example, when the third control information is related to random access, the number of information bits of the third control information may be larger than or equal to the number of information bits of the first control information and/or the second control information. Similarly, as another example, when the third control information is related to paging, the number of information bits of the third control information may be equal to or smaller than the number of information bits of the first control information and/or the second control information.

Also, what have been described in the various embodiments of the present invention above are assumed as being related to the NB-IoT system. However, it should be clearly understood that the corresponding descriptions may also be applied to a narrow band system similar to the NB-IoT system. For example, in the case of an MTC system, a PRB (i.e. a carrier) may be replaced with a narrow band (i.e. 6 RBs) of the MTC system; DCI format N1 with the DCI format 6-1A or DCI format 6-1 B; and DCI format N2 with the DCI format 6-2 in the various embodiments of the present invention described above. Also, an N-PDCCH and N-PDSCH may be replaced with an M-PDCCH and M-PDSCH; Type1-NPDCCH CSS with Type1-MPDCCH CSS; and Type2-NPDCH CSS with Type2-MPDCCH CSS.

Device in General to which the Present Invention May be Applied

Figure 15:
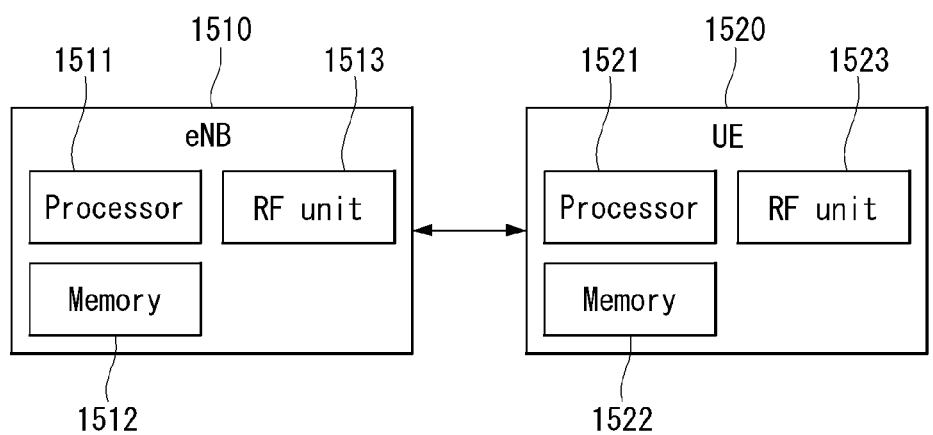
FIG. 15 illustrates a block diagram of a wireless communication device to which methods proposed by the present specification may be applied.

FIG. 15 illustrates a block diagram of a wireless communication device to which methods proposed by the present specification may be applied.

Referring to FIG. 15, a wireless communication system comprises an eNB 1510 and a plurality of UEs 1520 located within the range of the eNB 1510.

The eNB 1510 comprises a processor 1511, memory 1512, and Radio Frequency (RF) unit 1513. The processor 1511 implements the functions, processes and/or methods described with reference to FIGS. 1 to 14. Layers of a wireless interface protocol may be implemented by the processor 1511. The memory 1512, being connected to the processor 1511, stores various kinds of information to operate the processor 1511. The RF unit 1513, being connected to the processor 1511, transmits and/or receives a radio signal.

The UE 1520 comprises a processor 1521, memory 1522, and RF unit 1523.

The processor 1521 implements the functions, processes and/or methods described with reference to FIGS. 1 to 14. Layers of a wireless interface protocol may be implemented by the processor 1521. The memory 1522, being connected to the processor 1521, stores various kinds of information to operate the processor 3521. The RF unit 1523, being connected to the processor 1521, transmits and/or receives a radio signal.

The memory 1512, 1522 may be installed inside or outside the processor 1511, 1521 and may be connected to the processor 1511, 1521 via various well-known means. Also, the eNB 1510 and/or the UE 1520 may be equipped with a single antenna or multiple antennas.

Figure 16:
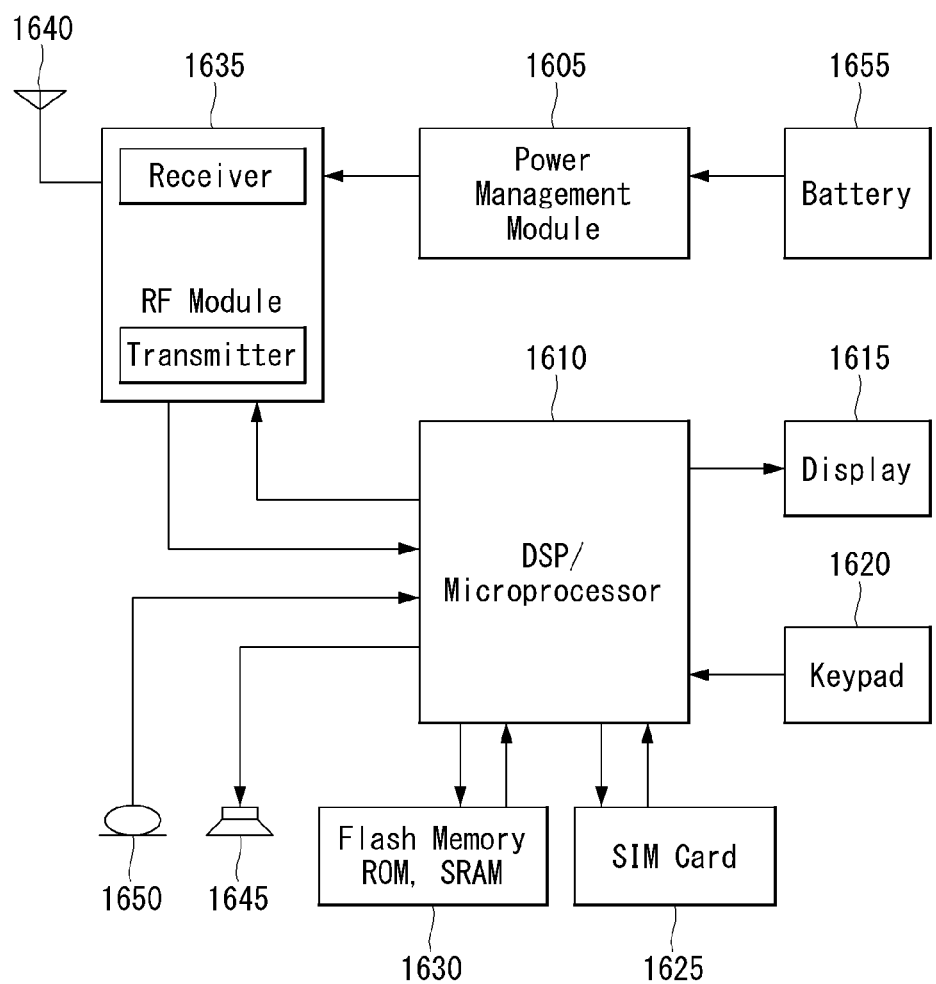
FIG. 16 illustrates a block diagram of a communication device according to one embodiment of the present invention.

FIG. 16 illustrates a block diagram of a communication device according to one embodiment of the present invention.

In particular, FIG. 16 illustrates the UE of FIG. 15 in more detail.

Referring to FIG. 16, a UE may comprise a processor (or digital signal processor (DSP)) 1610, RF module (or RF unit) 1635, power management module 1605, antenna 1640, battery 1655, display 1615, keypad 1620, memory 1630, Subscriber Identification Module (SIM) card 1625 (this component is optional), speaker 1645, and microphone 1650. The UE may also include a single antenna or multiple antennas.

The processor 1610 implements the functions, processes and/or methods described with reference to FIGS. 1 to 14. Layers of a wireless interface protocol may be implemented by the processor 1610.

The memory 1630, being connected to the processor 1610, stores various kinds of information to operate the processor 1610. The memory 1630 may be installed inside or outside the processor 1610 and may be connected to the processor 1610 via various well-known means.

The user enters command information such as a phone number by pushing (or touching) buttons of the keypad 1620 or voice activation using the microphone 1650. The processor 1610 receives such command information and processes the command information to perform an appropriate function such as calling the phone number. Operational data may be extracted from the SIM card 1625 or memory 1630. Also, the processor 1610 may display command information or operating information on the display 1615 for the user's attention and convenience.

The RF module 1635, being connected to the processor 1610, transmits and/or receives an RF signal. The processor 1610 delivers command information to the RF module 1635 to initiate communication, for example, to transmit a radio signal comprising voice communication data. The RF module 1635 comprises a receiver and a transmitter to receive and transmit a radio signal. The antenna 1640 performs a function of transmitting and receiving a radio signal. When receiving a radio signal, the RF module 1635 may deliver the signal to be processed by the processor 1610 and convert the signal into the baseband. The processed signal may be converted to audible signal output through the speaker 1645 or readable information.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

This document discloses a method for transmitting and receiving data in a wireless communication system supporting NB-IoT with examples based on the 3GPP LTE/LTE-A system; however, the present invention may be applied to various other types of wireless communication systems in addition to the 3GPP LTE/LTE-A system.

What is claimed is:

1. A method for receiving data by a user equipment (UE) in a wireless communication system supporting Narrow-Band-Internet of Things (NB-IoT), the method comprising:
monitoring a plurality of search spaces,
wherein a first search space is configured for a first Narrowband Physical Downlink Control Channel (NPDCCH) related to random access,
wherein a second search space is configured for a second NPDCCH related to SC-PTM (Single Cell Point to Multipoint), and
wherein based on the first search space and the second search space being in a same first subframe, only the first search space of the first search space and the second search space is monitored within the same first subframe;
receiving the first NPDCCH through the first search space, wherein the first NPDCCH includes first downlink control information (DCI) related to random access; and
receiving a first Narrowband Physical Downlink Shared Channel (NPDSCH) based on the first NPDCCH in a second subframe.

2. The method of claim 1, further comprising:
receiving the second NPDCCH through the second search space, wherein the second NPDCCH includes second DCI for scheduling a second NPDSCH; and
receiving the second NPDSCH based on the second NPDCCH, wherein the second NPDSCH carries a Single Cell-Multicast Control Channel (SC-MCCH) or a Single Cell-Multicast Traffic Channel (SC-MTCH).

3. The method of claim 2, wherein receiving the second NPDSCH is skipped in the second subframe.

4. The method of claim 2, wherein receiving the second NPDCCH is skipped in the second subframe.

5. The method of claim 1, wherein the monitoring of the second search space is skipped within (i) the same first subframe and (ii) the second subframe.

6. The method of claim 5, wherein the second search space is monitored by using (i) a group identifier or (ii) a single cell identifier.

7. The method of claim 2,
wherein based on the first NPDCCH and the first NPDSCH being related to paging, the first DCI is scrambled by using a paging identifier, and
wherein the first NPDCCH and the second NPDCCH correspond to DCI format N2.

8. The method of claim 2, wherein the second DCI further includes information related to a change notification for the SC-MCCH.

9. The method of claim 8, wherein the information related to the change notification for the SC-MCCH is composed of 1 bit.

10. The method of claim 2,
wherein based on the first NPDCCH and the first NPDSCH being related to random access, the first DCI is scrambled by using C-RNTI (Cell-Radio Network Temporary Identifier), and
wherein the first NPDCCH and the second NPDCCH correspond to DCI format N1.

11. The method of claim 2, further comprising:
receiving a system information block including carrier configuration information representing a carrier used for the SC-MCCH.

12. The method of claim 11, further comprising:
receiving SC-PTM configuration information carried through the SC-MCCH, wherein the SC-PTM configuration information includes carrier configuration information representing a carrier used for the SC-MTCH.

13. The method of claim 11, further comprising:
wherein the system information block further includes configuration information for a number of repetitions of at least one of the second PDCCH or the second PDSCH, and wherein the number of repetitions is configured according to a group identifier.

14. A User Equipment (UE) receiving data in a wireless communication system supporting NarrowBand-Internet of Things (NB-IoT), the UE comprising:
- a transceiver for transmitting and receiving a radio signal; and
- a processor connected functionally to the transceiver, wherein the processor is configured to:
- monitor a plurality of search spaces,
- wherein a first search space is configured for a first Narrowband Physical Downlink Control Channel (NPDCCH) related to random access,
- wherein a second search space is configured for a second NPDCCH related to SC-PTM (Single Cell Point to Multipoint), and
- wherein based on the first search space and the second search space being in a same first subframe, only the first search space of the first search space and the second search space is monitored within the same first subframe;
- receive the first NPDCCH through the first search space, wherein the first NPDCCH includes first downlink control information (DCI) related to paging or random access; and
- receive a first Narrowband Physical Downlink Shared Channel (NPDSCH) based on the first NPDCCH in a second subframe.

15. The UE of claim 14, wherein the processor is further configured to:
- receive the second NPDCCH through the second search space, wherein the second NPDCCH includes second DCI for scheduling a second NPDSCH; and
- receive the second NPDSCH based on the second NPDCCH, wherein the second NPDSCH carries a Single Cell-Multicast Control Channel (SC-MCCH) or a Single Cell-Multicast Traffic Channel (SC-MTCH).

16. The UE of claim 15, wherein the processor is further configured to skip the receiving of the second NPDSCH in the second subframe.

17. The UE of claim 15, wherein the processor is further configured to skip the receiving of the second NPDCCH in the second subframe.

18. The UE of claim 14, wherein the processor is configured to skip the monitoring of the second search space within (i) the same first subframe or (ii) the second subframe.

19. The UE of claim 15, wherein the processor is further configured to:
- receive a system information block including carrier configuration information representing a carrier used for the SC-MCCH.

20. The UE of claim 19, wherein the processor is further configured to:
- receive SC-PTM configuration information carried through the SC-MCCH, wherein the SC-PTM configuration information includes carrier configuration information representing a carrier used for the SC-MTCH.

* * * * *